US009645409B2

(12) United States Patent
Lundh

(10) Patent No.: US 9,645,409 B2
(45) Date of Patent: May 9, 2017

(54) FOLDABLE SPECTACLES

(71) Applicant: Jöran Lundh, Hong Kong (CN)

(72) Inventor: Jöran Lundh, Hong Kong (CN)

(*) Notice: Subject to any disclaimer, the term of this patent is extended or adjusted under 35 U.S.C. 154(b) by 0 days.

(21) Appl. No.: 14/428,064

(22) PCT Filed: Oct. 4, 2013

(86) PCT No.: PCT/EP2013/070738
§ 371 (c)(1),
(2) Date: Mar. 13, 2015

(87) PCT Pub. No.: WO2014/053647
PCT Pub. Date: Apr. 10, 2014

(65) Prior Publication Data
US 2015/0226979 A1 Aug. 13, 2015

Related U.S. Application Data

(60) Provisional application No. 61/780,414, filed on Mar. 13, 2013, provisional application No. 61/710,327, filed on Oct. 5, 2012.

(30) Foreign Application Priority Data

Oct. 5, 2012 (SE) ........................ 1251132

(51) Int. Cl.
*G02C 5/16* (2006.01)
*G02C 5/00* (2006.01)
(Continued)

(52) U.S. Cl.
CPC ............. *G02C 5/006* (2013.01); *G02C 3/006* (2013.01); *G02C 5/08* (2013.01); *G02C 5/143* (2013.01);
(Continued)

(58) Field of Classification Search
CPC ...... G02C 53/003; G02C 5/001; G02C 5/006; G02C 5/06; G02C 5/08; G02C 5/143;
(Continued)

(56) References Cited

U.S. PATENT DOCUMENTS 1,533,506 A * 4/1925 Mann .................. G02C 3/003
351/123
2,094,236 A 9/1937 Hempel
(Continued)

FOREIGN PATENT DOCUMENTS

CN 2598013 Y 1/2004
CN 101031840 A 9/2007
(Continued)

OTHER PUBLICATIONS

International Search Report of corresponding application PCT/EP2013/070738 mailed Jan. 31, 2014.

*Primary Examiner* — Huy K Mai
(74) *Attorney, Agent, or Firm* — Polster, Lieder, Woodruff & Lucchesi LC

(57) ABSTRACT

A pair of foldable spectacles has a two-lens front piece (30) to which two side pieces (20a, 20b) are pivotally connected by means of resilient corner hinges (25). The front piece (30) has a central hinge assembly (40) by means of which the front piece can be folded to a position where its lenses (31, 32) are held between and protected by the side pieces (20a, 20b). Each side piece (20a, 20b) has a first portion (21) which is connected to the front lens piece (30) by a resilient corner hinge (25), a second portion (22) which forms a free end portion of the side piece, and a resilient transition portion (23) between the first and second portions (21, 22). Thanks to the resilient corner hinges (25) and the resilient transition portion (23) of the two side pieces (20a, 20b), the spectacles (10) in use are held in place in a reliable manner (Continued)

since the side pieces (20a, 20b) are pressed against the side of the user's head.

27 Claims, 16 Drawing Sheets

(51) Int. Cl.
    *G02C 5/14*     (2006.01)
    *G02C 3/00*     (2006.01)
    *G02C 5/08*     (2006.01)
    *G02C 5/22*     (2006.01)
    *G02C 11/00*     (2006.01)

(52) U.S. Cl.
    CPC ............ *G02C 5/16* (2013.01); *G02C 5/2218* (2013.01); *G02C 11/00* (2013.01); *G02C 2200/02* (2013.01); *G02C 2200/04* (2013.01); *G02C 2200/06* (2013.01)

(58) Field of Classification Search
    CPC .......... G02C 5/16; G02C 5/20; G02C 5/2218; G02C 2200/02; G02C 2200/04; G02C 2200/06; G02C 2200/18; G02C 3/003
    USPC ............................................ 351/63, 113, 153
    See application file for complete search history.

(56) References Cited

U.S. PATENT DOCUMENTS

| | | | |
|---|---|---|---|
| 2,280,666 A | | 4/1942 | Schofield |
| 2,307,419 A | | 1/1943 | McNeill et al. |
| 2,975,426 A | * | 3/1961 | Rabb ..................... G02C 5/006 2/13 |
| 3,395,964 A | * | 8/1968 | Nieder ..................... G02C 5/06 351/113 |
| 3,627,406 A | | 12/1971 | Blumenthal |
| 3,796,482 A | | 3/1974 | Blumenthal |
| 4,037,946 A | | 7/1977 | Blumenthal |
| 4,681,410 A | | 7/1987 | Paulsen |
| 4,720,186 A | | 1/1988 | Douillard |
| 5,532,766 A | * | 7/1996 | Mateer ................... G02C 5/006 351/149 |
| 5,666,181 A | | 9/1997 | Conway |
| 5,828,436 A | | 10/1998 | Lester |
| 6,048,062 A | | 4/2000 | Chow |
| 6,102,541 A | * | 8/2000 | Kuo ....................... G02C 5/006 2/454 |
| 6,409,335 B1 | * | 6/2002 | Lipawsky ................ G02C 5/06 351/124 |
| 2004/0141148 A1 | | 7/2004 | Chou |
| 2004/0263775 A1 | | 12/2004 | Sawhney |
| 2006/0092373 A1 | | 5/2006 | Gao |
| 2009/0188015 A1 | | 7/2009 | Grad et al. |
| 2009/0190088 A1 | | 7/2009 | Strobel |
| 2010/0053546 A1 | | 3/2010 | Lanaro |
| 2011/0037939 A1 | * | 2/2011 | Pulvino .................. G02C 3/003 351/63 |
| 2012/0224136 A1 | * | 9/2012 | Wang ....................... G02C 5/06 351/63 |
| 2013/0063695 A1 | * | 3/2013 | Hsieh .................... G02C 5/2218 351/113 |
| 2013/0235324 A1 | * | 9/2013 | Rubin .................... G02C 5/006 351/63 |

FOREIGN PATENT DOCUMENTS

| | | |
|---|---|---|
| CN | 101419343 A | 4/2009 |
| CN | 101799591 A | 8/2010 |
| EP | 1447705 | 8/2014 |
| GB | 855976 A | 12/1960 |
| JP | 3138469 U | 1/2008 |
| WO | 9302378 A1 | 2/1993 |
| WO | 2010022900 | 3/2010 |

* cited by examiner

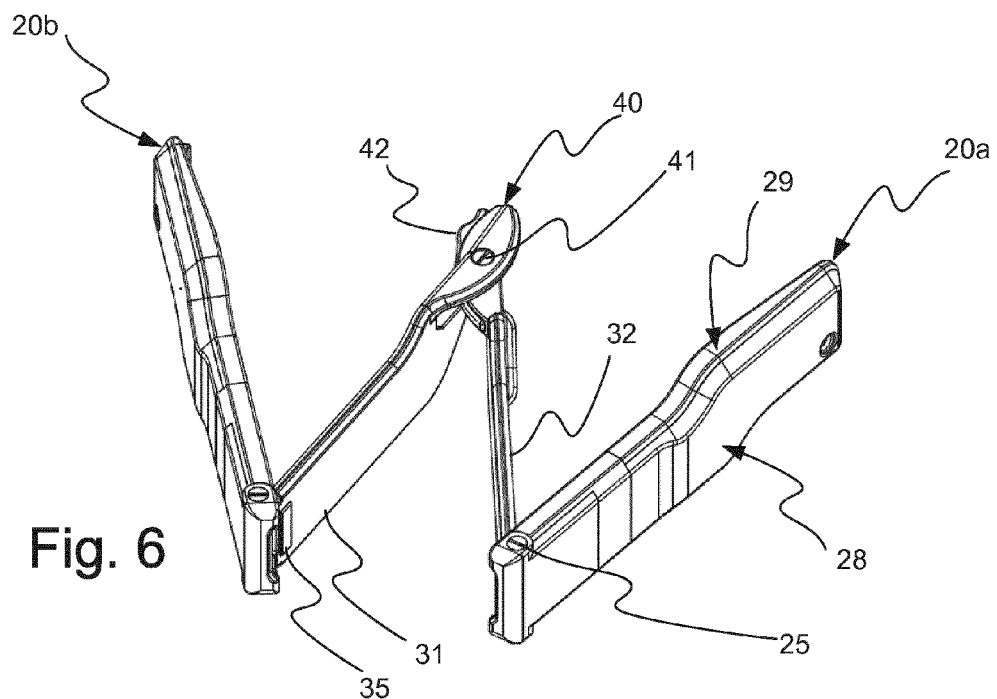
Fig. 6
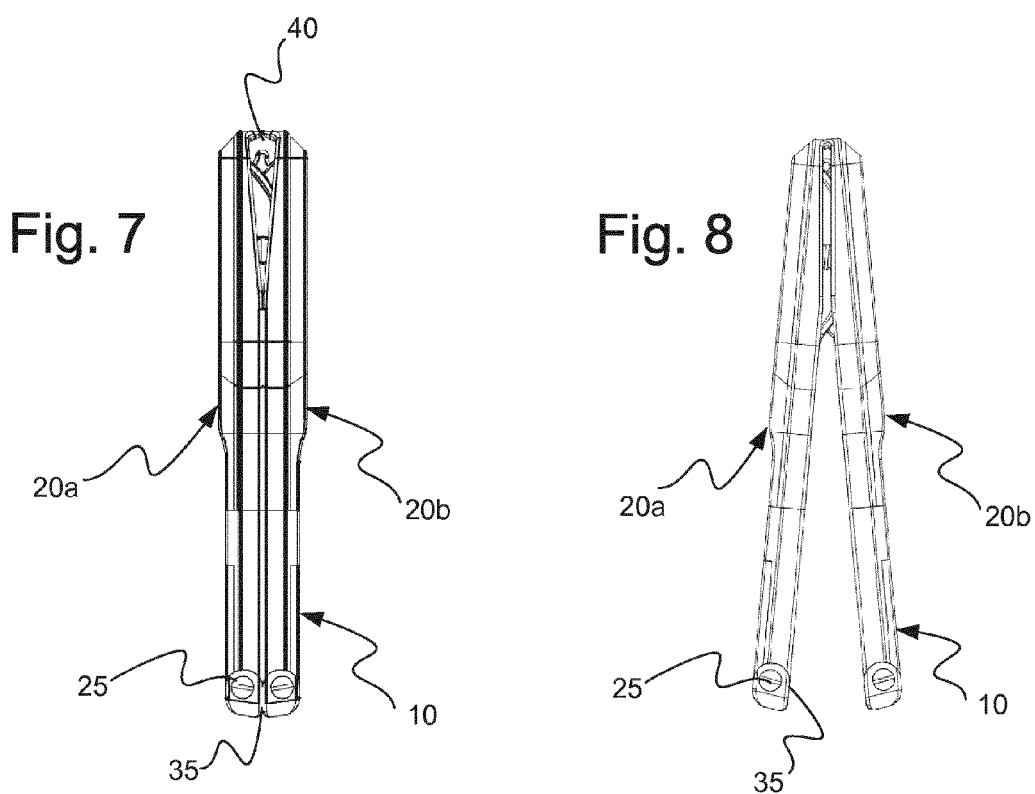
Fig. 7
Fig. 8

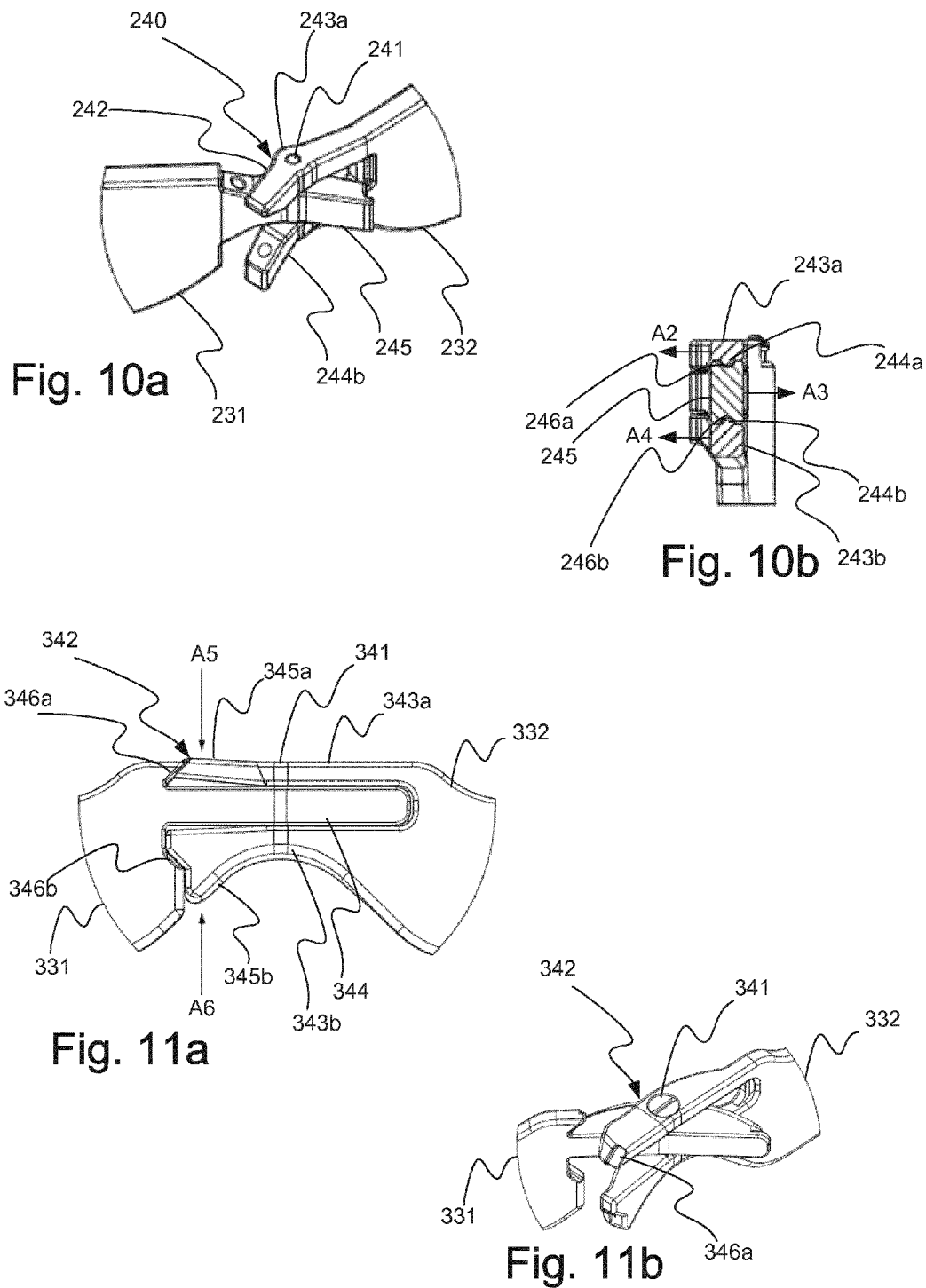

FOLDABLE SPECTACLES

CROSS-REFERENCE TO RELATED APPLICATIONS

The present application is the US national stage under 35 U.S.C. §371 of International Application No. PCT/EP2013/070738 which was filed on Oct. 4, 2013 and which claims the priority of Swedish App. No. 1251132-5 filed Oct. 5, 2012, U.S. Provisional App. No. 61/710,327 filed Oct. 5, 2012 and U.S. Provisional App. No. 61/780,414 filed Mar. 13, 2013, all of which are incorporated herein by reference.

TECHNICAL FIELD

The present invention relates to a pair of foldable spectacles, or eyeglasses, and more particularly to side pieces, as well as a lens front piece of such foldable spectacles.

BACKGROUND

Spectacles which are foldable, not only by its side pieces but also around a hinge arranged between the lenses, have been around for a while. By folding the spectacles in different ways the size of the spectacles may be reduced and the fragile lenses may be protected from external forces while they are not used.

An example of such spectacles is disclosed in WO2010/022900A1 showing foldable spectacles with a folding mechanism between the two lenses which makes it possible to fold the lenses inwards, so that they may be protected by the side pieces when the spectacles are not used. Moreover, the side pieces are arranged in a telescopic manner which allows the spectacles to have a reduced size when folded. However, this known structure is not rigid in an unfolded state, i.e. when a user is using them, which means that the spectacles will not retain its shape. The known spectacles, when in a folded state, are not safely secured which means that parts of the spectacles may fall out or open up and therefor no longer be protected from external forces.

Another problem of prior-art spectacles, which is also valid for the spectacles previously described, is that they are only designed for a specific head size, as the side pieces are attached at a fixed distance from each other.

Further background art is reflected in US2010/0053546 which discloses eyeglass side pieces with flexible corrugations. A problem with these corrugations is that even though they may flex the side pieces in two directions, they are only adapted to adjust to a head size larger than the width between the side pieces. Another problem is that when the side pieces flex outwards parts of the same may create an undesired contact with the user's head.

Yet another example is disclosed in US2012/0224136 where a pair of foldable spectacles is shown and where the lenses in a folded state may be protected by portions of the spectacles. However, when the spectacles are in its folded state they are not safely secured which means that the spectacles may open or parts may fall out which may damage the lenses.

The foldable reading glasses disclosed in US2009/0190088 suffer from similar problems. Further background art is disclosed in U.S. Pat. No. 6,048,062 and U.S. Pat. No. 4,720,186.

SUMMARY

An object of the invention is to provide a novel type of spectacles, especially a novel type of reading spectacles, and related parts by which the problems above can be mitigated. This object is achieved by the technique defined in the appended independent claims; preferred embodiments being defined in the related dependent claims.

In one aspect of the invention, a side piece for a pair of foldable spectacles comprises a first portion configured to be hinged to a front lens piece; a second portion configured to press against a user's head; and a resilient transition portion between the first and second portions. An advantage of this structure is that the side piece adjusts its shape depending on the size and shape of the user's head during use.

In an alternative embodiment of the present invention, the second portion is configured to be rotatable with respect to the first portion about a longitudinal axis of the side piece. This is advantageous since the side pieces are not then only adaptable to the size of a user's head but also to the shape of it.

In another embodiment, the resilient transition portion comprises a bridge between the first and second portion extending along a longitudinal axis and where the first portion, the bridge and the second portion are made in one piece. This structure is advantageous during manufacturing processes since the first and the second portions may be handled as one piece.

In yet another embodiment, the first portion further comprises a resilient hinge configured to connect the first portion to the front lens piece and where the resilient hinge may be biased towards an idle position, in which the side piece is folded towards the front lens piece. The resilient hinge is advantageous since it enables the side pieces to also adjust to a small head size, i.e. when the width of the head is smaller than the distance between two side pieces.

In an embodiment, the side piece comprises a contact member which extends at least partly along the periphery of the first and second portions and which is configured to frictionally engage with the user's head. This design is advantageous since it provides contact between the side piece and the user's head so that the side piece will stay in place during use without having to be put around an ear of a user, as most spectacles today.

In another embodiment, the contact member comprises a flexible plastic material for providing said frictional engagement when it is in contact with the user's head. This brings the advantage that the contact member provides a soft feeling to the user when it presses on the user's head and it also secures the side piece on the head of the user by means of friction.

In yet another embodiment of the present invention, the side pieces comprises a center portion and a rim portion, wherein the rim portion protrudes from the center portion and wherein the center portion and the rim portion together defines a space for accommodating a lens portion in a folded state of the spectacles. The space for accommodating the lens portion protects the same against dirt and external forces which may damage the lens when they are not in use.

In another aspect of the invention, a front lens piece for a pair of spectacles is provided. The front lens piece comprises a right eye lens portion and a left eye lens portion, wherein the right eye lens portion and the left eye lens portion are interconnected by a central hinge assembly having a central hinge and a locking device. An advantage of this structure is that the shape and extension of the front lens piece may be adjusted by means of the central hinge and the locking device so that it is adapted to the face of the user and that the front lens piece may be locked in one position.

In an embodiment, the right eye lens portion and the left eye lens portion may be folded towards each other, around the central hinge. Hereby the front lens piece may be protected from dirt and external forces when not in use.

In another embodiment, the front lens piece further comprises at least two magnets, wherein at least one magnet is located at one end of the each lens portion, and wherein the magnets are in contact with each other when the lens portions are in a folded position. This design is advantageous since it provides a secure locking mechanism in the folded position.

In yet another aspect of the invention, a foldable pair of spectacles is provided which comprises two side pieces and a front lens piece of the type described above. A pair of spectacles of this novel structure will have the advantages explained above. The spectacles are easy to fold and unfold, respectively, and thanks to the new design the spectacles are easy and comfortable to use.

In an alternative embodiment, each connection between the front lens piece and the two side pieces comprises a resilient corner hinge configured to bias the side pieces toward the user's head. This means that side pieces are always pushing towards the user's head, which is advantageous especially if the width of the user's head is smaller than the distance between the two side pieces. It also means that the side pieces always are in their folded position when the spectacles are not used.

In an aspect, there is provided a pair of foldable spectacles which is improved over prior art and which comprises a two-lens front piece to which two side pieces are pivotally connected by means of resilient corner hinges. The front piece has a central hinge assembly by means of which the front piece can be folded to a position where the lenses are held between and protected by the side pieces. Each side piece has a first portion which is connected to the front lens piece by a resilient corner hinge, a second portion which forms a free end portion of the side piece, and a resilient transition portion between the first and second portion. Thanks to the resilient corner hinges and the resilient transition portion of the two side pieces, the spectacles in use are held in place in a reliable manner since the side pieces are pressed against the side of the user's head.

In another aspect, there is provided a pair of foldable spectacles comprising a front lens piece with a right eye lens portion and a left eye portion. The lens portions are interconnected by a central hinge assembly having a central hinge and a locking device. The spectacles further comprise two side pieces, each of which having a first portion hinged to said front lens piece and a second portion configured to press against a user's head by means of a resilient transition portion arranged between said first side piece portion and said second side piece portion.

BRIEF DESCRIPTION OF THE DRAWINGS

Embodiments of the present invention will be described in the following, reference being made to the appended drawings, wherein:

FIG. 6 is a perspective view of the spectacles of FIG. 1 in a semi-folded state, FIG. 7 is a top view of the spectacles of FIG. 1 in a completely folded state, FIG. 8 is a top view of the spectacles of FIG. 1 wherein one end of the spectacles is in a completely folded state and the other end is slightly open, FIGS. 10a-b show a central hinge assembly according to a second embodiment, FIGS. 11a-b show a central hinge assembly according to a third embodiment.

DETAILED DESCRIPTION OF EMBODIMENTS

Figure 1:
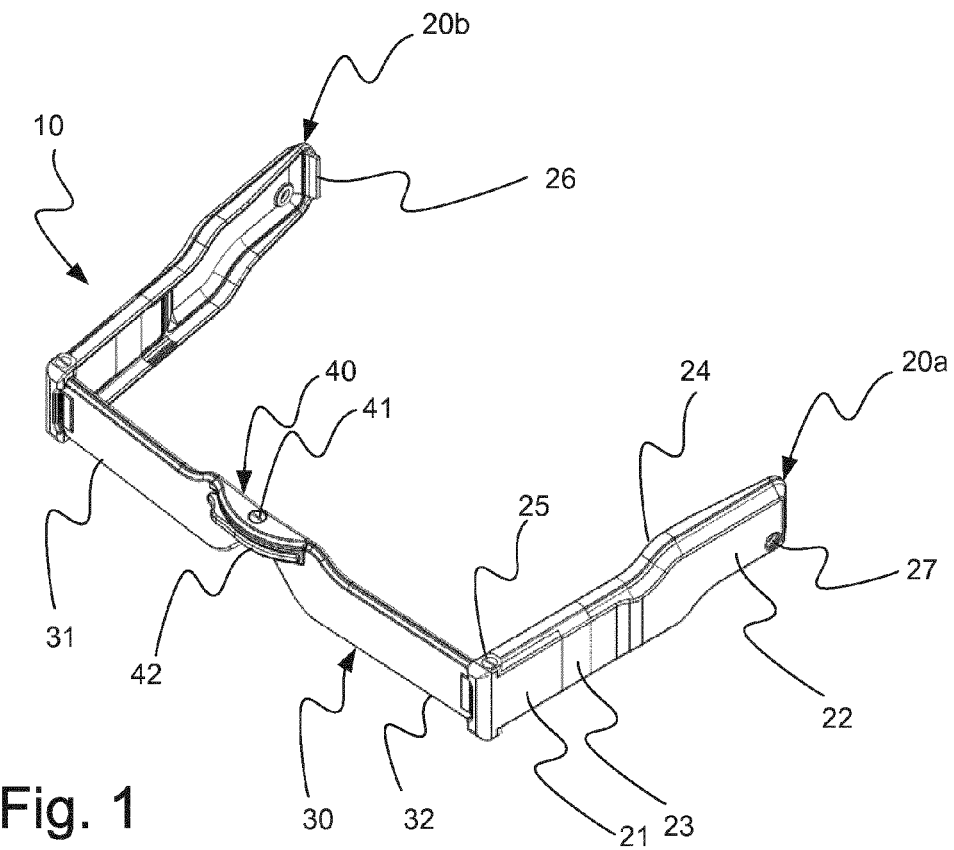
FIG. 1 is a perspective view of a pair of spectacles according to an embodiment of the present invention in an open, unfolded state.

In FIG. 1 a pair of spectacles 10, preferably reading spectacles, according to an embodiment is shown in a state where a user may place them on his/her head. This state is from now on called an open or unfolded state. The pair of spectacles 10 comprises two side pieces 20a, 20b and a front lens piece 30. The side pieces 20a, 20b are connected to each end of the front piece 30, respectively, by hinges 25, preferably corner hinges.

The two side pieces 20a, 20b each includes a first portion 21 adjacent to the front piece 30 and a second portion 22 which extends from the first portion 21 away from the front piece 30. Both portions 21, 22 may have a cross section which for instance resembles a C-shape, and the extension of the first portion 21 may be shorter than the extension of the second portion 22. The portions 21, 22 may be made of a rigid or semi-rigid plastics material, metal material, such as aluminum, or a somewhat flexible material. The shape of the first and second portion 21, 22 will be further described in the following.

Between the first and second portions 21, 22 there is a transition portion, here in the shape of a resilient member 23 which interconnects the first and second portion 21, 22 so that the first portion 21, the second portion 22 and the resilient member 23 together form the side piece 20a, 20b. An alternative to the resilient member 23 may be a hinge or another type of joint (not shown). The resilient member 23 includes a flexible material, preferably a rubber or plastic material which has the ability to spring back to an idle position. In this case the idle position is when the first portion 21, the second portion 22 and the resilient member 23 extend basically along a straight line, as is shown in FIG. 1. In the shown embodiment the resilient member 23 has the same thickness as the width of the cross section of the first and second portion 21, 22. The resilient member 23 provides the side pieces 20a, 20b with a spring back effect and if the length of the first portion 21 the second portion 22 the spring back effect may be varied. In another embodiment (not shown) the first portion 21, the second portion 22 and the resilient member 23 may have a curved shape in its idle position.

In an alternative embodiment the side piece 20a, 20b may be made in one piece and the resilient member 23 may include a recess (not shown) which for instance may have the shape of a V in cross section. The recess forms an area of the resilient member 23 with less material then its surrounding parts, and this area provides the resilient member 23 with spring back effect. In another embodiment the resilient member may be a resilient mechanical hinge (not shown), and in yet another embodiment the side piece may be formed in one piece in a flexible material which also provides a spring back effect and allows the side piece to adapt its shape depending on the size and shape of the head of the user. In an embodiment where the side pieces each are formed in one piece, the side pieces may include a transition portion wherein its shape and material provides the side pieces with its spring back effect. This effect is illustrated in FIG. 3 where the spectacles 10 are placed on the head of a user. Hence, each side piece 20a, 20b comprises two portions 21, 22 which are hingedly connected in such way that the side piece 20a, 20b in use presses against the head H of the user so that the spectacles 10 are efficiently kept in place.

At least partly around the edges or the periphery of the first portion 21, the second portion 22 and the resilient member 23 there is provided a contact member 24 (FIG. 5) which forms that part of the side pieces 20a, 20b which is in contact with the head H of the user. The contact member 24 is made of a flexible material so that it will not break when the form of the side pieces 20a, 20b is changed. Therefore the material of the contact member 24 should preferably be soft and flexible and with such properties that the interaction between the skin of the user and the contact member 24 results in an increased friction or a frictional engagement that allows the spectacles 10 to stay in position on the user. For example, the material of the contact member 24 may be the same as for the resilient member 23, which is a rubber or plastic material.

Each side piece 20a, 20b further comprises a resilient hinge 25 for connecting its first portion 21 to the front piece 30, preferably arranged at one end of the first portion 21. The resilient hinge 25 may include a spring (not shown) and the side pieces 20a, 20b may be articulated around the resilient hinge 25. The resilient hinge 25 and the end of the front piece 30 which is connected to the resilient hinge 25 is located within a recess (not shown) of the first portion 21.

In an alternative embodiment of the invention (not shown), the resilient hinge 25 may further comprise interlocking means configured to lock the side pieces 20a, 20b in the position shown in FIG. 1. The interlocking means may comprise a groove or recess and a matching rib or boss which is received in the groove/recess and which is configured to prevent the associated side piece from folding back towards the front lens piece 30. The interlocking means may be locked by unfolding the side piece from the front lens piece 30 and unlocked by gently pushing on the side of the side piece or pressing on top and/or under the resilient hinge 25. As soon as the interlocking means is unlocked, the resilient hinge 25 provides the side piece with its preferred spring back effect. This interlocking means is advantageous since the user then may unfold the spectacles and put them on his/her head with just one hand.

The second portion 22 may optionally include a grip element 26 (FIG. 2) which may be made of the same material as the contact member 24 and which preferably has the shape of a wedge. The grip element 26 is located at the free end of the second portion 22 and preferably presses firmly into the skin of the user and provides a supplementary contact position to make sure that the spectacles 10 stay in place during use. Also, the second portion 22 may optionally include an opening 27 close to its free end which makes it possible to securely attach a strap or a fastener for a key ring or the like cf. FIGS. 15c and 16c.

Further, the pair of spectacles 10 includes a central hinge assembly 40 (FIG. 4) located at the middle of the front lens piece 30. The central or nose hinge assembly 40 comprises a central hinge 41 and a locking device 42, around which central hinge 41 the front lens piece 30 may be folded. This structure will be described in detail below.

Figure 2:
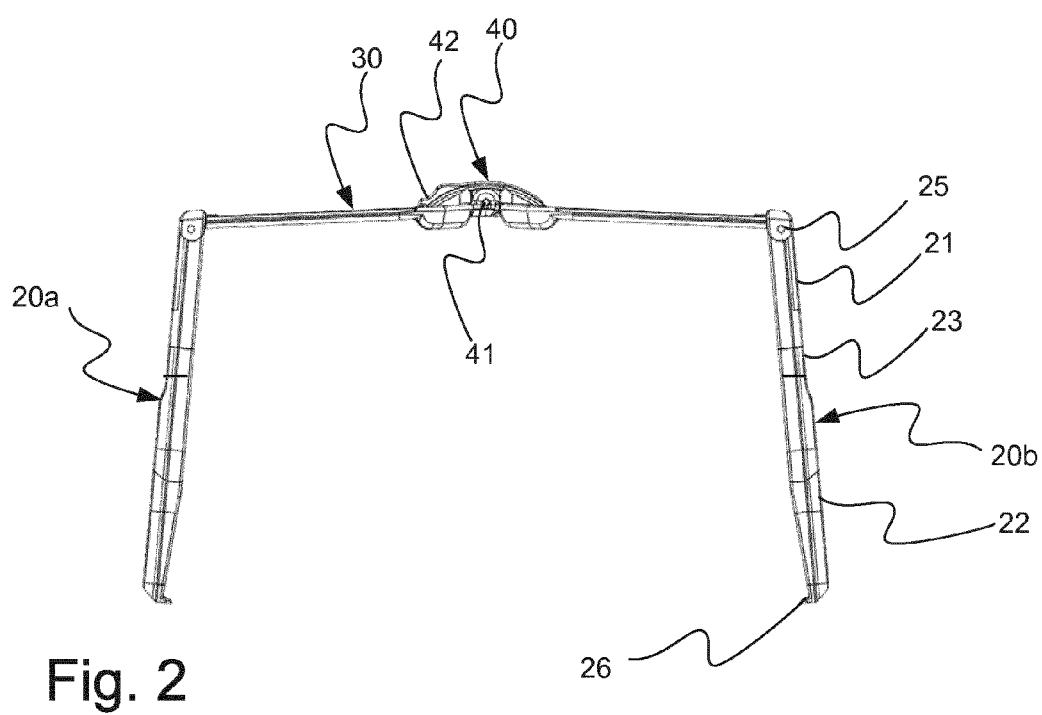
FIG. 2 is a bottom view of the spectacles of FIG. 1, FIG. 3a-c show the spectacles of FIGS. 1-2 placed on a user

FIG. 2 shows the pair of spectacles 10 in its unfolded state, where the two side pieces 20a, 20b are in their idle positions with respect to the position of the first portion 21, the second portion 22 and the resilient member 23. However, the two side pieces 20a, 20b are with reference to the front piece 30, in a position where the resilient hinge 25 is subject to tension which forces the two side pieces 20a, 20b to their resting state, i.e. the state where the side pieces 20a, 20b are located close to and along the extension of the front piece 30. This tension will provide a gentle pressure, from the side pieces 20a, 20b against the head H of the user.

Figure 3A:
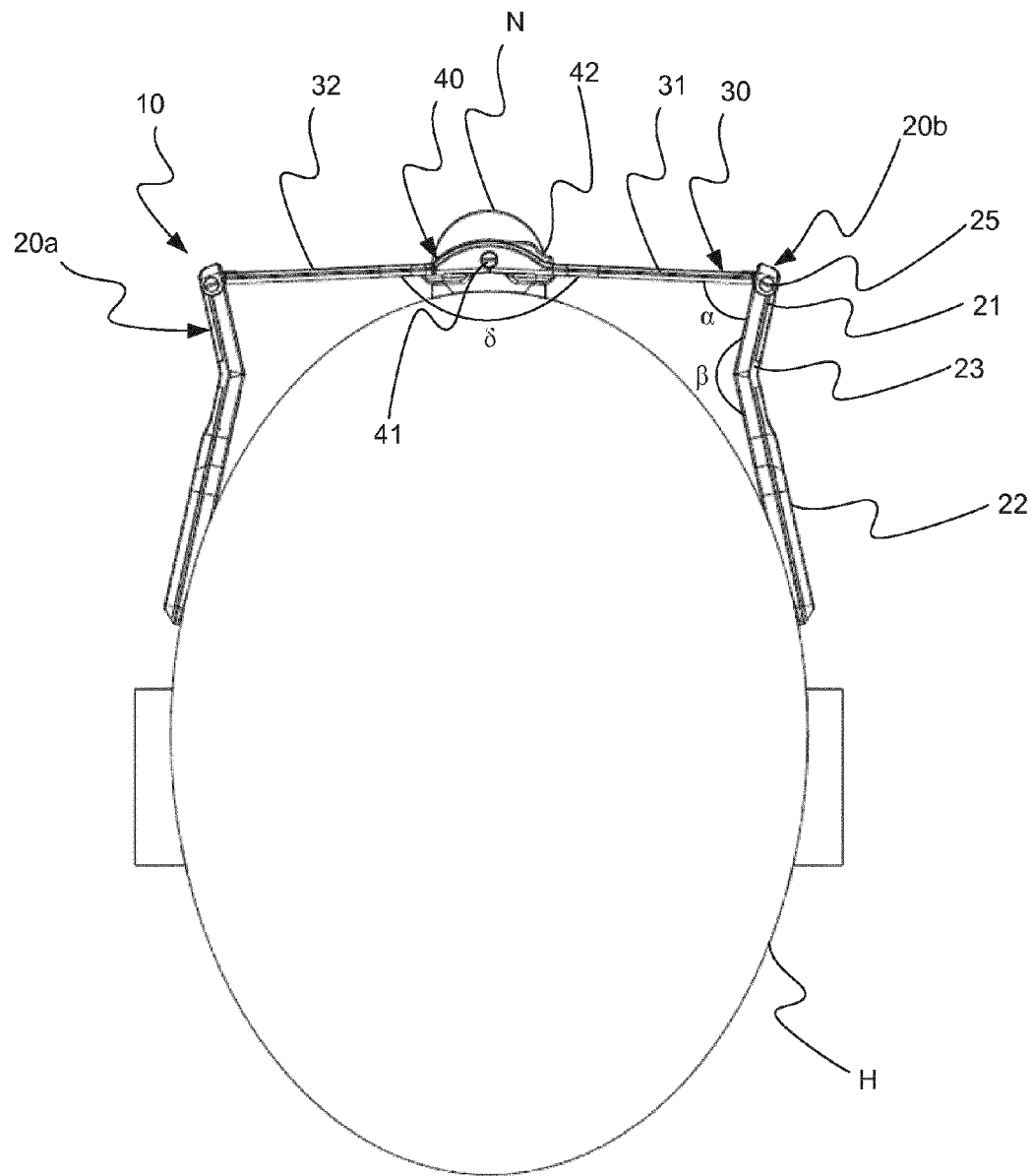
Figure 3B:
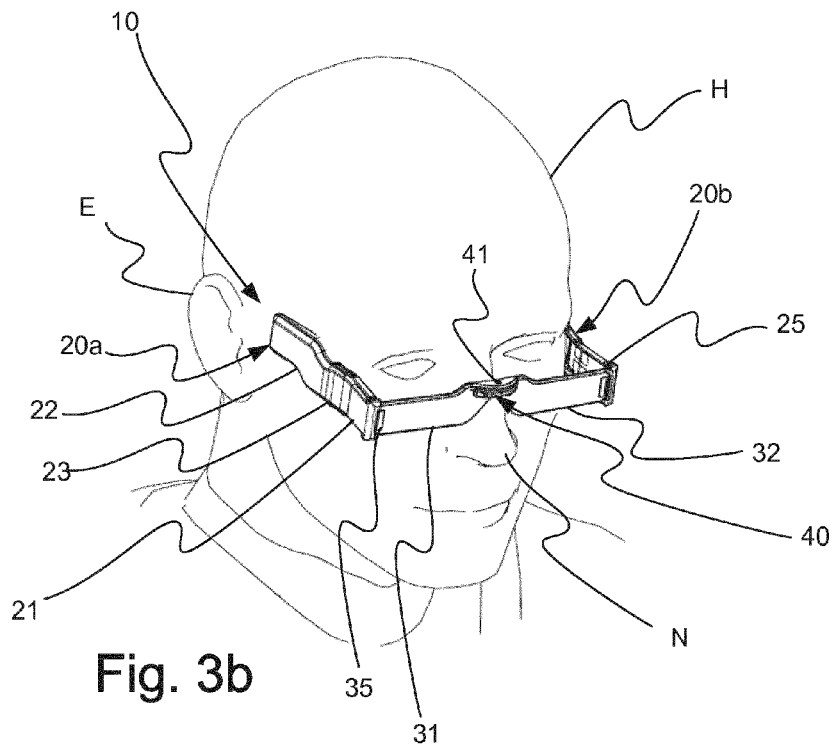
Figure 3C:
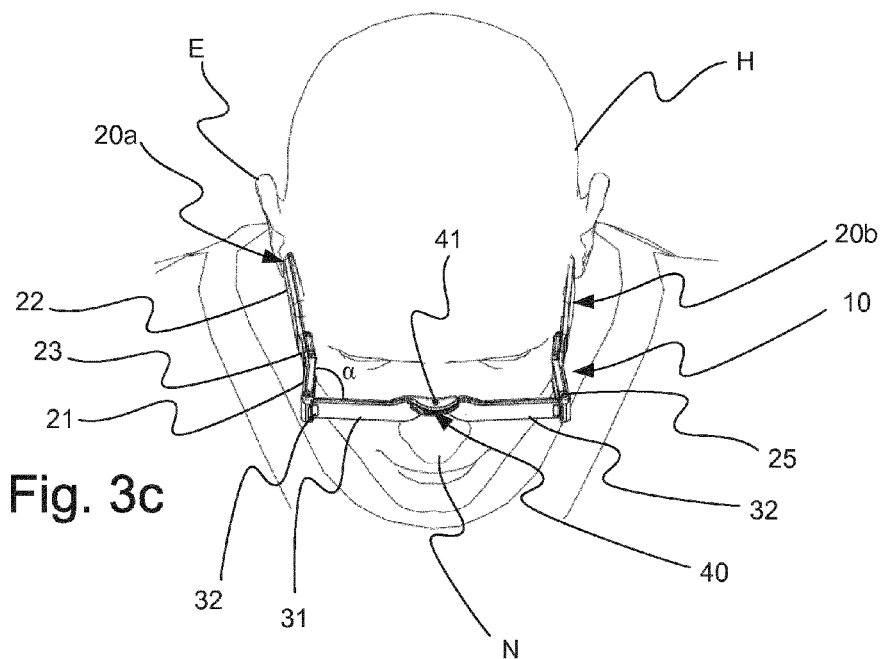

In FIGS. 3a-c the pair of spectacles 10 are placed on a user's head H with its central hinge assembly 40 around the area of the nose N of the user H, wherein the two side pieces 20a, 20b are adapting their shape with reference to the shape and size of the head H of the user. The second portion 22 of the side pieces 20a, 20b is tilted or inclined, by means of the resilient member 23, outwards from the idle position and a force is applied to the resilient member 23, pressing the side pieces 20a, 20b towards the head H of the user. To create the force which presses the second portion 22 against the head H of the user, the first portion 21 should form an angle α less than 90° with the front piece 30, preferably an angle α between 65° and 80° or an angle that forces the second portion 22 to tilt outwards when adjusting to the size of the head H of the user. Preferably the second portion 22 should be tilted outwards in such away that an angle β between the first and second portion 21, 22 is more than 180°, preferably 190°-220°.

Furthermore, the force applied to the resilient hinge 25, in the unfolded state, provides a pressure on the head H of the user. This total pressure on the head H prevents the spectacles 10 from sliding on or falling off from the user during use. The side pieces 20a, 20b may of course be of any length but in the embodiment shown in FIGS. 1-8 the side pieces 20a, 20b extend back to the temple of the user and do not depend on the ear E of the user (as in known spectacles), where the side pieces 20a, 20b also apply the pressure during use. They may also be adapted to extend behind the ears E of the user, as is common for known spectacles (not shown). Known spectacles have side pieces that extend back and around the top of the user's ear which means that the position of the front lens piece on the user's nose depends on the position and shape of the user's ear. Since the present spectacles 10 are preferably used as reading spectacles, the user wants to be able to look over the top edge of the spectacles and see further away without taking them off. Therefor, a preferred embodiment of the spectacles has side pieces which extend only to the area of the user's temples which means that the user him/herself may choose the position of the side pieces while using the spectacles.

The central hinge assembly 40 and its locking device 42 are configured to lock the lens portions 31, 32 so that the lens portions 31, 32 don't fold while using them. The locking device 42 may lock the lens portions 31, 32 in different positions depending on the need of the user and his/her wish of the width of the front lens piece 30. In FIG. 3a a second angle δ indicates an example of an angle which may be adjusted by the user due to his/her needs. Preferably the angle δ may vary between 160° and 190°.

Figure 4:
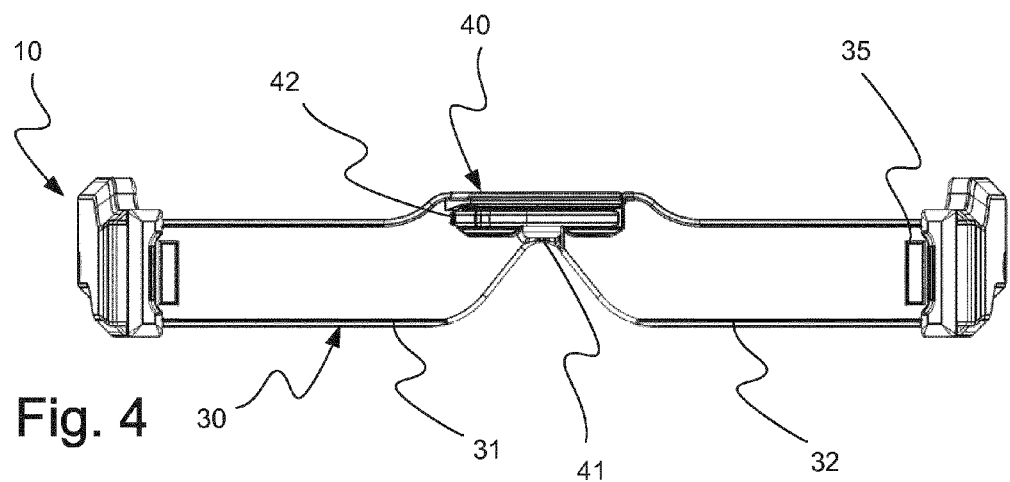
FIG. 4 is a front view of the spectacles in FIG. 1 with a central hinge assembly according to one embodiment.

Referring to FIG. 4 the front piece 30 of the spectacles 10 comprises a right eye lens portion 31 and a left eye lens portion 32 which in this embodiment are identical and inverted but which may, in other embodiments, have shapes that differ from each other. Between the two lens portions 31, 32 the central hinge assembly 40 is provided. The central hinge assembly 40 comprises, as has been explained above, a central hinge 41 between the two lens portions 31, 32 which allows the lens portions 31, 32 to be articulated around the central hinge 41, and a locking device 42 which can lock the lens portions 31, 32 together in a specific position.

The locking device 42 has an idle position in which the lens portions 31, 32 are locked, and a second position in which the portions 31, 32 are unlocked and where the locking device 42 always strives to enter its idle position. Hence, the locking device 42 locks the lens portions 31, 32 in a position where the portions 31, 32 basically form a straight line, seen from above, by e.g. snap locking into the idle position where it is in contact with a surface (shown as e.g. 131a in FIG. 9b) of the lens portion 31, 32. This surface prevents the locking device 42 from leaving its idle position. When unlocking the locking device 42, the user may easily disengage the locking device 42 and then fold the lens portions 31, 32. In another embodiment, the locking device 42 may be unlocked by gently pushing on one of the lens portions 31, 32 so that the locking device 42 unsnaps. The central hinge assembly 40 with the central hinge 41 and the locking device 42 can also be seen in for example FIG. 1. In alternative embodiments the locking device 42 may lock the lens portions 31, 32 in a position which differs from a straight line.

As has been described above, the front piece 30 is connected to the side pieces 20a, 20b by means of the resilient hinges 25 at the end of the first portion 21 of the side pieces 20a, 20b. Close to the two ends where the front piece 30 is connected to the side pieces 20a, 20b, both lens portions 31, 32 comprises a magnet 35. The function of these magnets 35 will be described with reference to for example FIG. 7.

Figure 5:
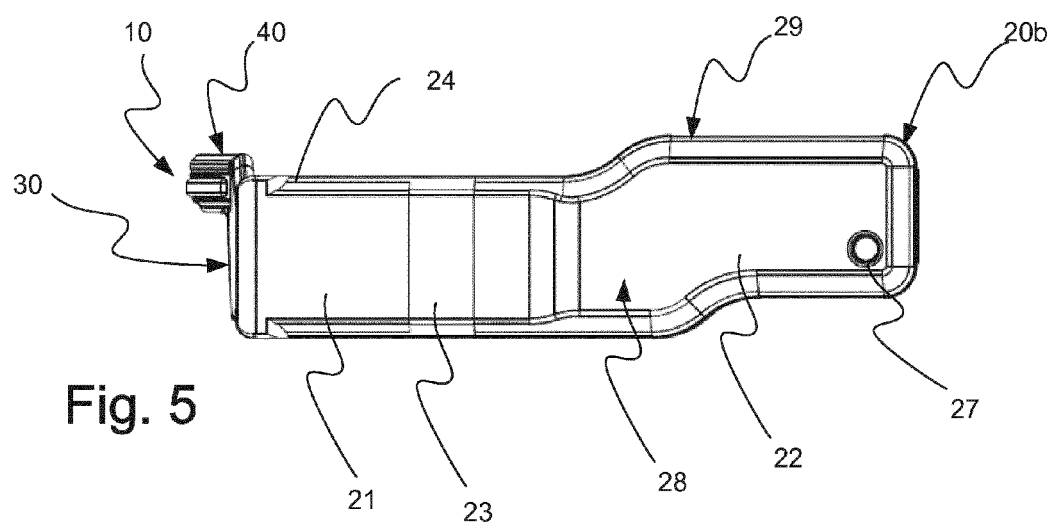
FIG. 5 is a side view of the inside of a side piece of the spectacles of FIG. 1.

FIG. 5 shows the inside of one of the side piece 20a, 20b which preferably are identical to the other side piece 20a, 20b. Each side piece 20a, 20b may also be explained by having a center portion 28 which may consist of parts of the first and second portion 21, 22 and the resilient member 23, and a peripheral rim portion 29 which extends at least partly around the center portion 28, preferably around the entire center portion 28. The contact member 24 is attached to the rim portion 28 by means of e.g. glue if the side piece 20a, 20b and the contact member 24 are made of different materials, and extends around the two long sides and the short side opposite the short side where the resilient hinge 25 is located. The rim portion 29 protrudes from one side of the center portion 28 in such a way that together the center portion 28 and the rim portion 29 define a space of the side piece 20a, 20b. The shape of this space is designed in such a way that when the spectacles 10 are folded each space of the side piece 20a, 20b may enclose at least a part of one lens portions 31, 32. Preferably both side pieces 20a, 20b together entirely enclose both of the lens portions 31, 32 and the central hinge assembly 40, whereby the front lens portion 30 is covered and protected from external forces. The center portion 28, the rim portion 29 and their function are further illustrated in FIGS. 6 and 7.

A semi-folded state of the spectacles 10 is shown in FIG. 6, where the locking device 42 has been unlocked and the two lens portions 31, 32 have been folded inwards around the central hinge 41. While folding the lens portions 31, 32 the two side pieces 20a, 20b are pushed towards each other so that the rim portion 29 and the two ends of each side piece 20a, 20b move towards the corresponding rim portion 29 and end of the other side piece 20a, 20b until the spectacles 10 are in a folded state, as is shown in FIG. 7.

Thus, FIG. 7 shows the pair of spectacles 10 in a completely folded state where the entire front lens piece 30 with its two lens portions 31, 32 and the central hinge assembly 40 are enclosed by the two side pieces 20a, 20b. At one end (the lower end in FIG. 7), the two free ends of the two side pieces 20a, 20b are engaged with each other by means of the magnets 35 located on the lens portions 31, 32. In this embodiment the engagement comprises one magnet 35 on each side of the from lens piece 30 but in an alternative embodiment the engagement may comprise several magnets and yet in another embodiment the engagement may comprise only one magnet arranged on one side and e.g. a metal portion arranged on the other side.

FIG. 8 shows a state of the spectacles 10 where one end (the lower end in FIG. 8 where the magnets 35 are located) has been slightly opened. These spectacles 10 have a wide range of application since they may also be used as a note or money clip, a tiepin or any accessory of that size utilizing a clamping effect between two elongated members. The magnets 35, as well as the spring biasing, form a strong engagement for these other applications. Since the spectacles 10, in a folded state are small the user may find them hard to find. This engagement makes it possible for the user to attach the folded spectacles to a shirt pocket or the like so that he/she doesn't loose them.

Figure 9A:
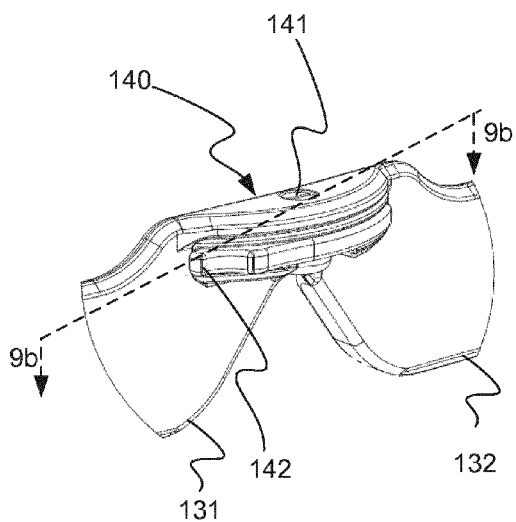
FIGS. 9a-d show a central hinge assembly with a locking device of a pair of spectacles according to a first embodiment.
Figure 9B:
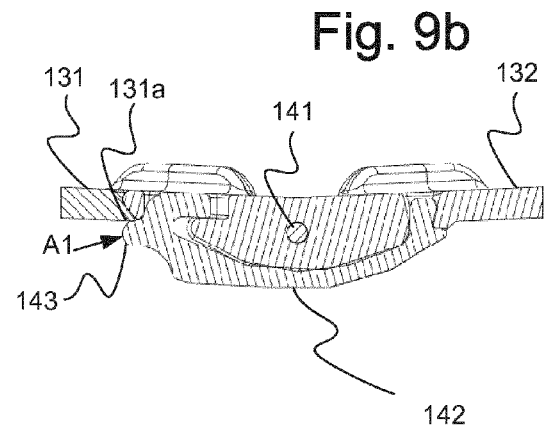
Figure 9C:
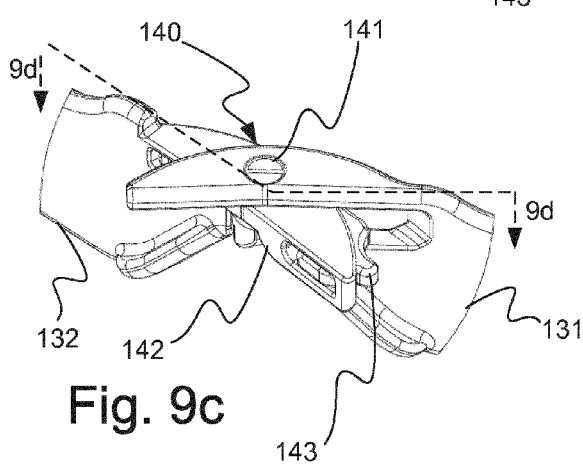
Figure 9D:
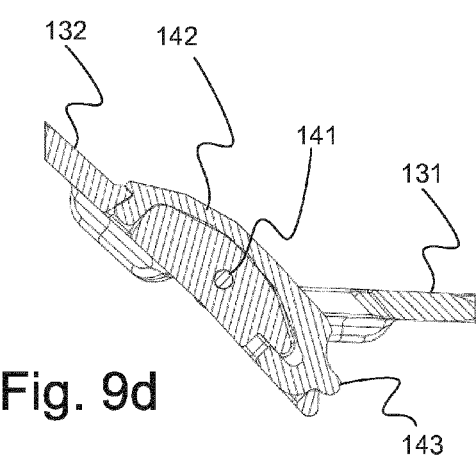

In FIGS. 9a-9b the two lens portions 131, 132 and a central hinge assembly 140 with a locking device 142 according to a first embodiment are shown. FIGS. 9a-9b show the locking device 142 in its locked state, whereas FIGS. 9c and 9d show the locking device 142 in its unlocked state. To unlock the locking device 142 the user pushes on a lug 143, in the direction of the arrow A1, of the locking device 142 (in FIG. 9b the right side of the locking device 142 should be pushed to the left), so that the lug 143 is released from the interaction with the lens portion 131. The locking device 142 may of course be arranged on either of the lens portion 131, and it may also be unlocked by gently pressing on one of the lens portions 131, 132 and then folding the lens portions 131, 132 around the central hinge 141.

FIGS. 10a-10b show a locking device 242 according to a second embodiment which may be integrated in the two lens portions 231, 232. One of the lens portions 232 may comprise two end parts 243a, 243b both including a protrusion 244a, 244b, shown in FIG. 10b. The other lens portion 231 may have one end part 245 including two recesses 246a, 246b which are interacting with the two protrusions 244a, 244b in the locked state (shown in FIG. 10b) of the locking device 242. To unlock the locking device 242 the user gently presses on one lens portion 231, 232, in the direction of the arrows A2, A3, A4, so that the protrusions 244a, 244b are released from the recesses 246a, 246b. The three end parts 243a, 243b, 245 may be rotated around the center hinge 241 which runs through all the parts 243a, 243b, 245.

In FIGS. 11a-11b there is shown a locking device 342 according to a third embodiment wherein one of the lens portions 332 includes two end parts 343a, 343b and wherein the other lens portion 331 includes one protruding end part 344. The left ends 345a, 345b of the two end parts 343a, 343b of one lens portion 332 are in an idle state inclined or bent slightly outwards. In a locked state the slightly bent ends 345a, 345b are interacting with two diagonal surfaces 346a, 346b located at the bottom of the protruding end part 344 on the other lens portion 331. To unlock the locking device 342 the user presses the slightly bent ends 345a, 345b towards each other, like the arrows A5, A6 in FIG. 11a show or force the locking device 342 to unlock by means of an increased pressure, so that two ends 345a, 345b are released from the interaction with the surfaces 346a, 346b. The user may then fold the lens portions 331, 332 as shown in FIG. 11b. The three end parts 343a, 343b, 344 may be rotated around the central hinge 341 which extends through all the parts 343a, 343b, 344.

Figure 12A:
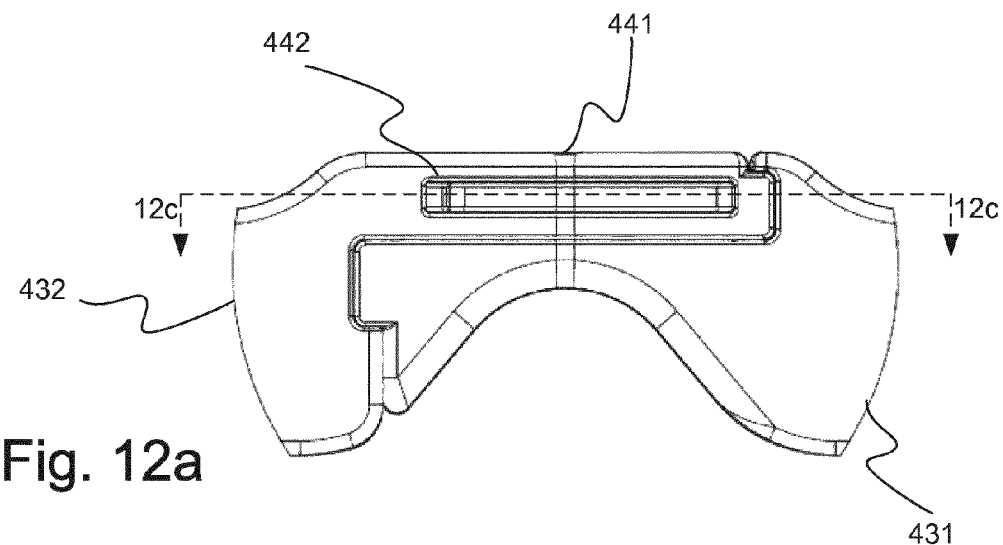
FIGS. 12a-c show a central hinge assembly according to a fourth embodiment.
Figure 12B:
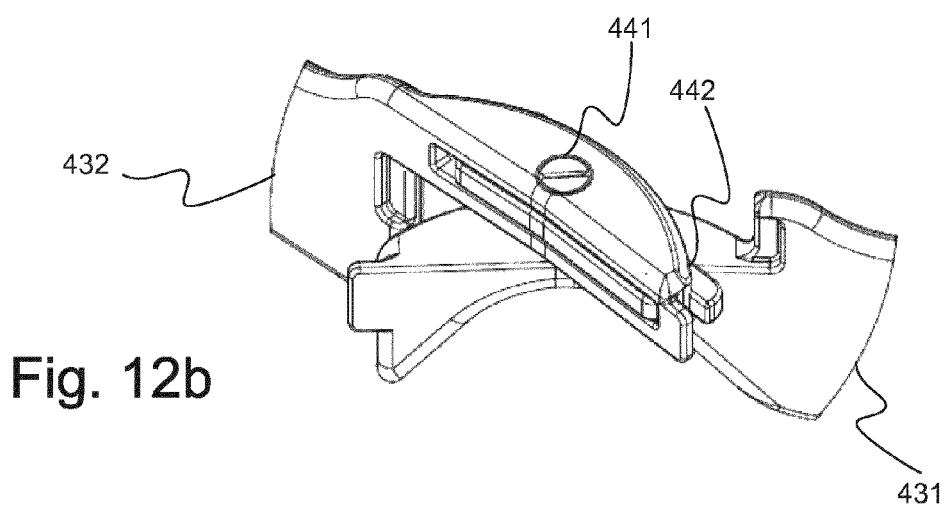
Figure 12C:
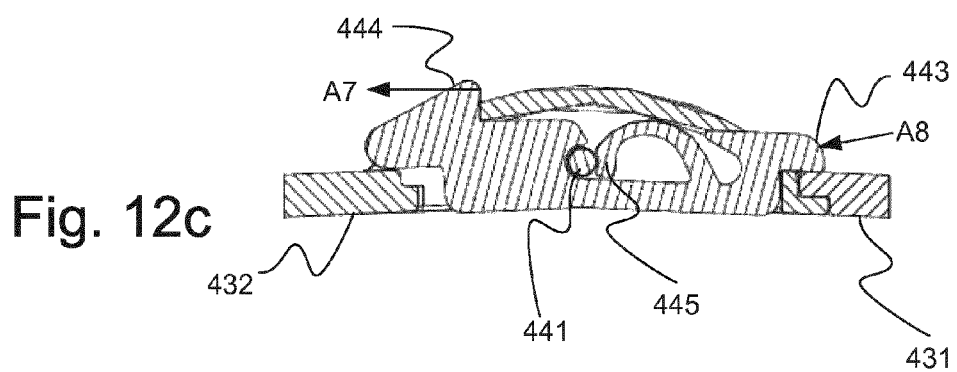

FIGS. 12a-c show a locking device 442 according to a fourth embodiment, which is arranged in one of the lens portions 431, 432 (in these figures in the left eye lens portion 432), wherein the two lens portions 431, 432 are connected to each other by means of the central hinge 441. In a locked state a first lug 443 (to the right side in FIG. 12c) interacts with one of the lens portions 431. To unlock the locking device 442 the user pushes on a second lug 444, in the direction of the arrow A7 (in FIG. 12c, the left lug 444 of the locking device 442 is pulled to the left), pushes the first lug 443 in the direction of the arrow A8, or forces the locking device 442 to unlock by means of increasing a pressure on one side of the front lens portion 30, so that the first lug 443 is released from the lens portion 431. The locking device 442 includes a resilient member 445 which is in an idle state when the locking device 442 is in its locked state, and therefor presses the locking device 442 back towards its idle state when the user pulls the second lug 444 to the left.

Figure 13A:
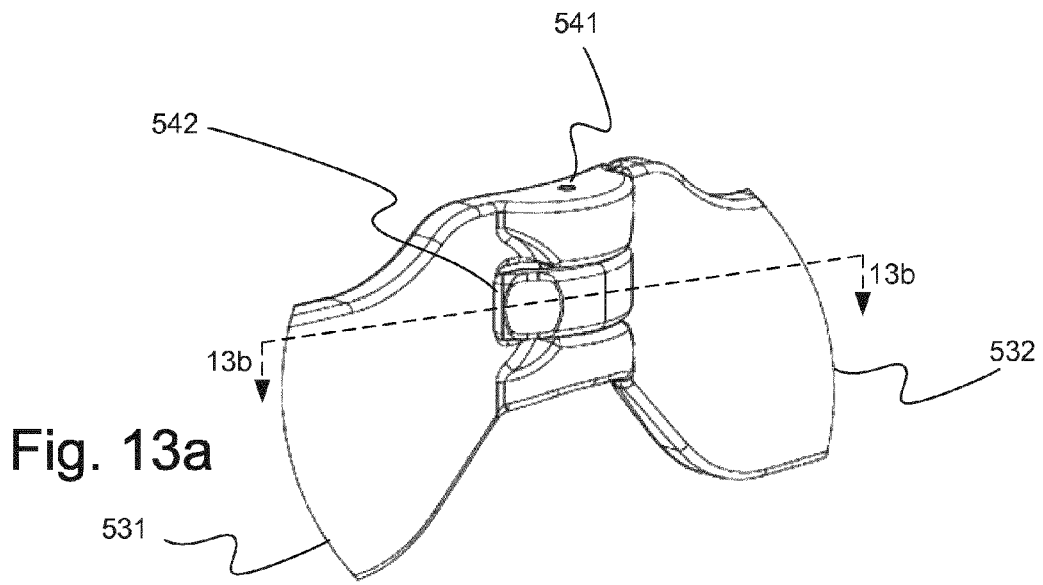
FIGS. 13a-c show a central hinge assembly according to a fifth embodiment.
Figure 13B:
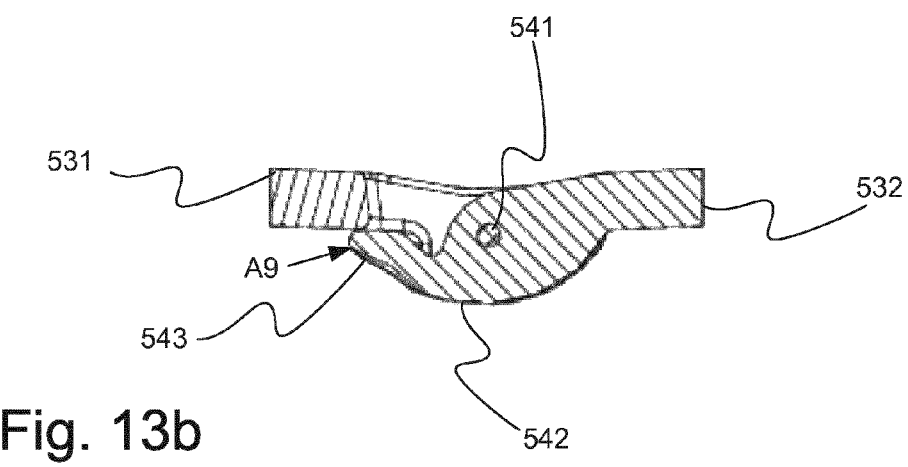
Figure 13C:
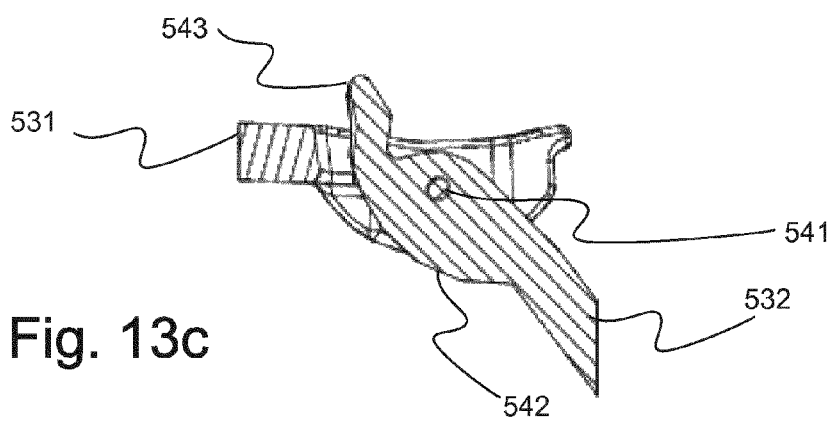

In FIGS. 13a-c of a locking device 542 according to a fifth embodiment is shown, comprising a type of snap-locking means 543 which snaps into a locked state shown in FIG. 13b and rotatably arranged by means of the central hinge 541. To unlock the locking device 542 the user pushes on the snap-locking means 543 in the direction of the arrow A9 shown in FIG. 13b or force the locking device 324 to unlock by means of an increased pressure on one of the lens portions 531, 532, which then will release the snap-locking means 543 from the engagement with one of the lens portions 531, 532.

Figure 14A:
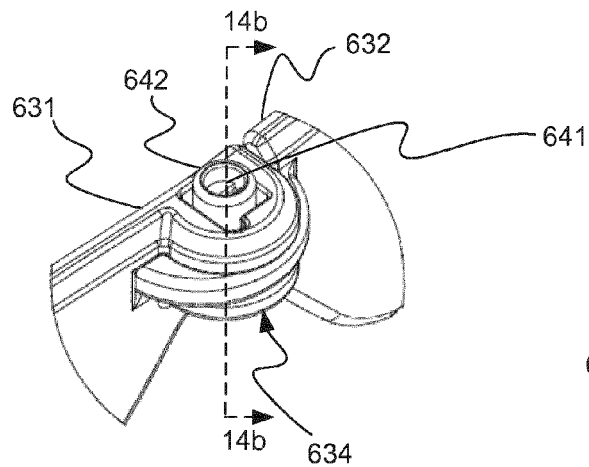
FIGS. 14a-d show a central hinge assembly according to a sixth embodiment.
Figure 14B:
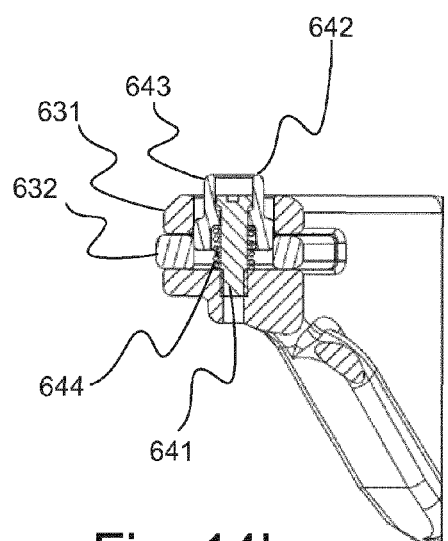
Figure 14C:
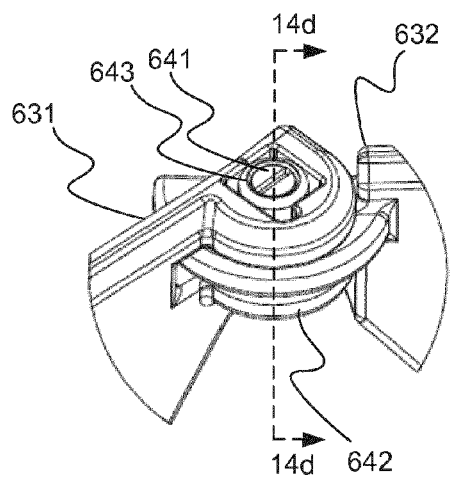
Figure 14D:
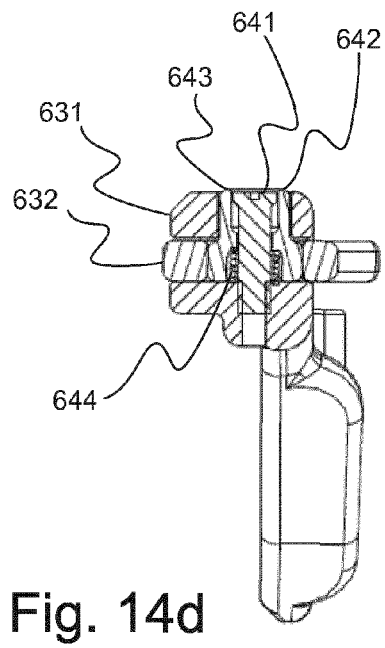

FIGS. 14a-d show a locking device 642 according to a sixth embodiment comprising a displaceable element 643 for locking the two lens portions 631, 632 arranged around the central hinge 641. FIGS. 14a-b show the locking device 642 in its locked state where the displaceable element 643 slightly protrudes at the top of the locking device 642, above to top of the central hinge 641. The displaceable element 643 is in this state in contact with both of the lens portions 631, 632, as is shown in FIG. 14b, in such a way that the lens portions 631, 632 are locked in this position. FIGS. 14c-d show the locking device 642 in its unlocked state. To unlock the locking device 642 the displacement element 643 may be pushed down, alternatively pushed down and rotated, so that the lower part of the displacement element 643 is only in contact with one of the lens portions 631, 632. The displacement element 643 is resilient connected, by means of for example a spring 644, to the locking device 642 in such a way that its idle state is when the locking device 642 is in its locked state.

The locking device of the various embodiments may be made of plastic, metal or any other suitable material and may all be either a separate device being assembled to the spectacles 10 or integrated in the two lens portions 31, 32. The locking device may also be arranged to lock the lens portions in different position.

Figure 15A:
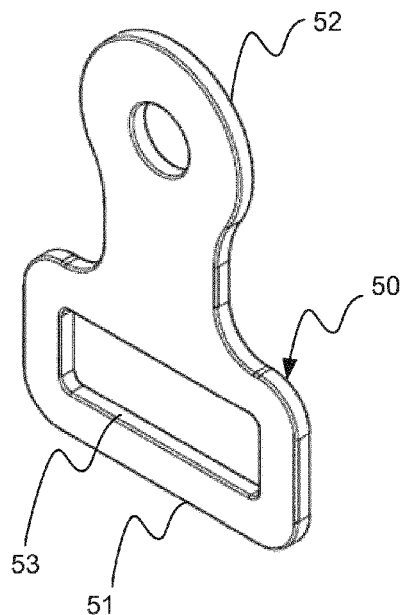
FIGS. 15a-c show a holder according to an embodiment.
Figure 15B:
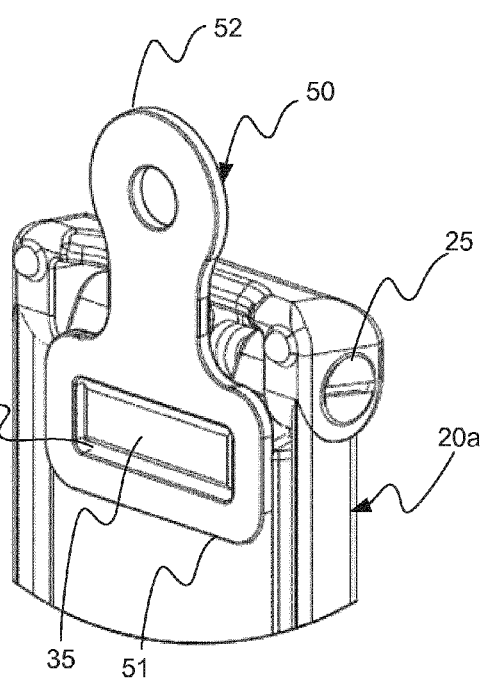
Figure 15C:
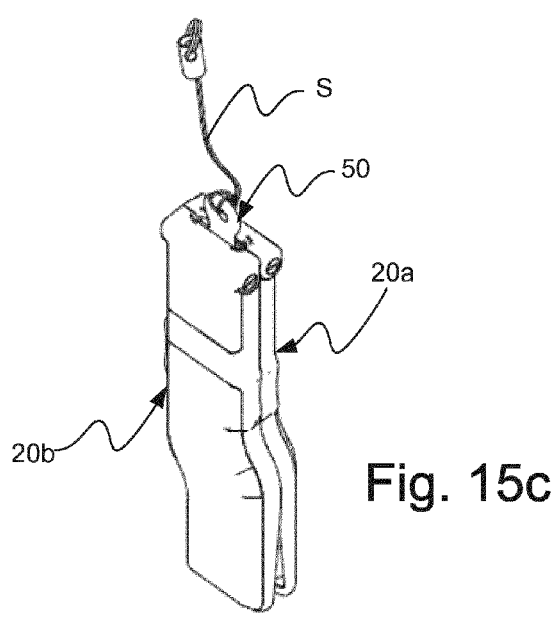

With reference to FIGS. 15a-c a substantially T-shaped holder 50 is illustrated which preferably is made of metal and has a mounting portion 51 to be arranged between the side pieces 20a, 20b in their folded position and to hold, by a projecting ring portion 52, a strap S, a key-ring (not shown) or the like. In the mounting portion 51 of the holder 50 there is a substantially rectangular opening 53 which has a shape that corresponds to the shape of the magnets 35 located on the front lens piece 30 so that when the front lens piece 30 is folded and the user has inserted the holder 50 between the side pieces 20a, 20b, the magnets 35 may still be in contact with each other. In a folded state the holder 50 is fixed between the side pieces 20a, 20b so that the user may attach a key or the like to the key-ring without any risk of dropping them. The key-ring may be replaced by a strap S or the like depending on the need of the user. Also, the metal material helps the holder 50 to stay in place between the side pieces 20a, 20b since it is drawn to the magnets 35.

Figure 16A:
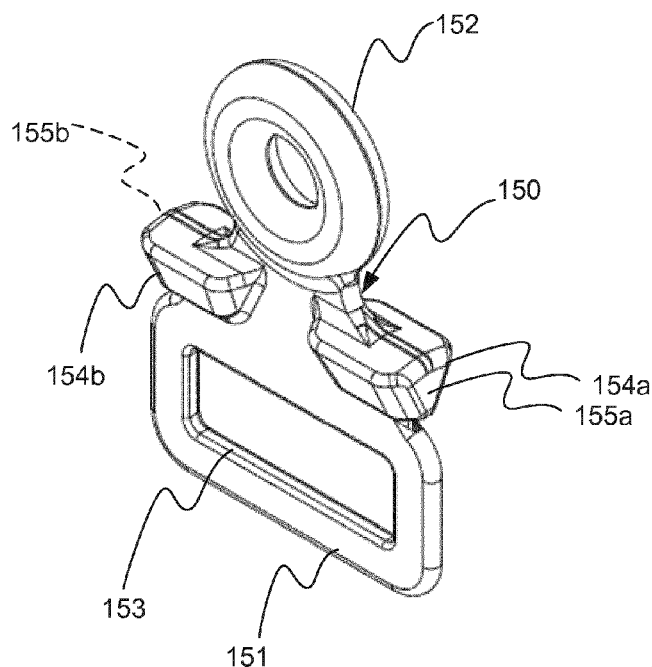
FIGS. 16a-c show a holder according to an alternative embodiment.
Figure 16B:
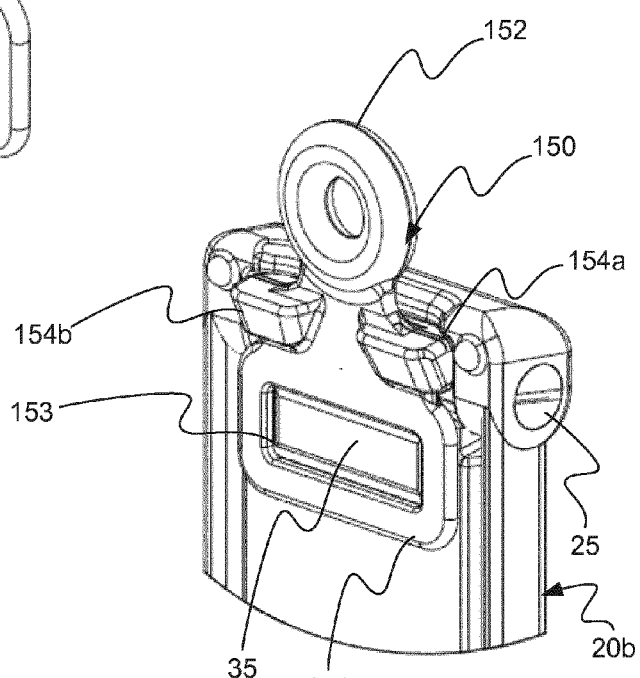
Figure 16C:
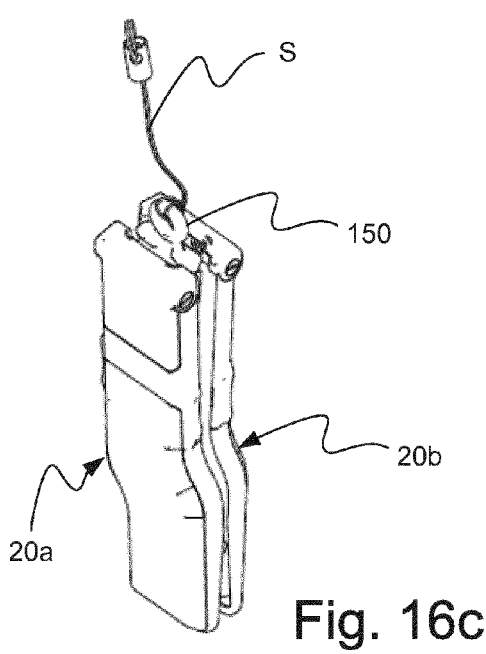

In FIG. 16a-c a holder 150 according to an alternative embodiment is shown, which is preferably made of a plastic material. The holder 150 comprises a rectangular mounting portion 151 and a projecting ring portion 152. The mounting portion 151 has an opening 153 adapted to fit the magnets 35 on the front piece 30, and the ring portion 152 is configured to hold a strap S, a key-ring or such. The holder 150 further comprises two shoulders 154a, 154b located on the side of the holder 150 between the portions 151, 152. The shoulders 154a, 154b are adapted to fit the space between the end of the side piece 20a, 20b, where the resilient hinge 25 is located, and the magnets 35 so that side portions 155a, 155b of the shoulders 154a, 154b are wedged into the inside surfaces of the side pieces 20a, 20b. When the user folds the pair of spectacles 10 the holder 150 stays in place and keys or the like may be hung in the holder 150.

Figure 17A:
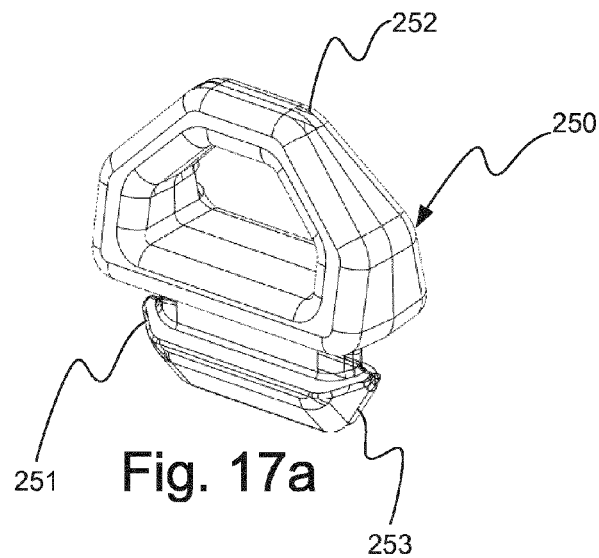
FIGS. 17a-c show a holder according to an alternative embodiment.
Figure 17B:
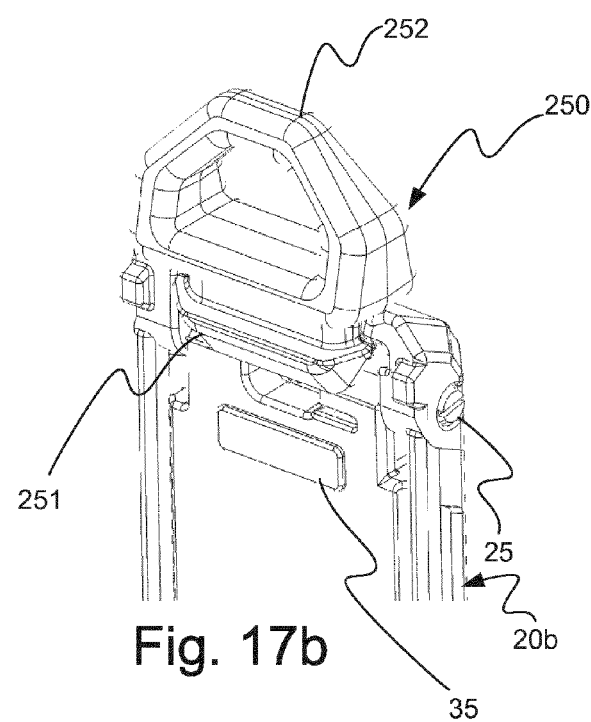
Figure 17C:
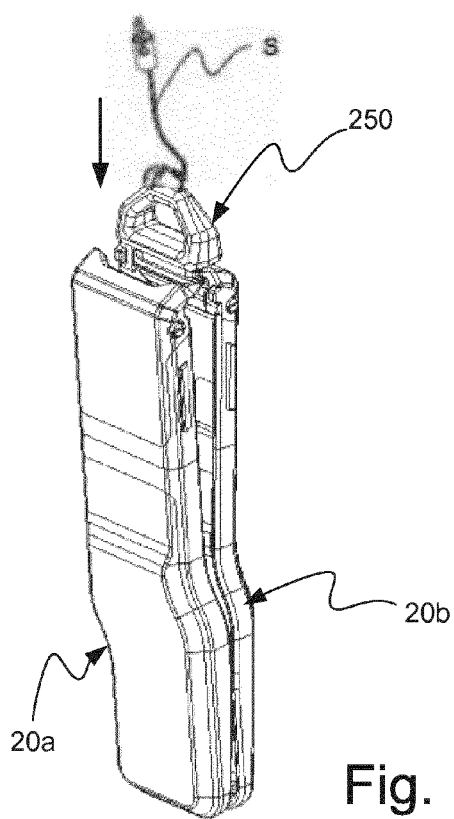

With reference to FIGS. 17a-c a holder 250 according to another alternative embodiment is shown. The holder 250 comprises a mounting portion 251 and a projecting ring portion 252 which is configured to hold a strap S, a key-ring or the like. The ring portion 252 and the mounting portion 251 are of different design than the previous embodiment. In particular, the mounting portion 251 does not have any opening, but it comprises a V shaped part 253 which is easy to connect to the end of the side piece 20b. This means that the magnet 35 is exposed in an efficient manner which improves the locking effect in the folded state; see FIG. 17c. The V shaped part 253 of the mounting portion 251 also makes it possible to attach the holder 250 after the side pieces 20a, 20b have been folded together. The user can just push the holder 250 in between the side pieces 20a, 20b, as the arrow in FIG. 17c shows, until it snaps into position without unfolding the spectacles.

Figure 18A:
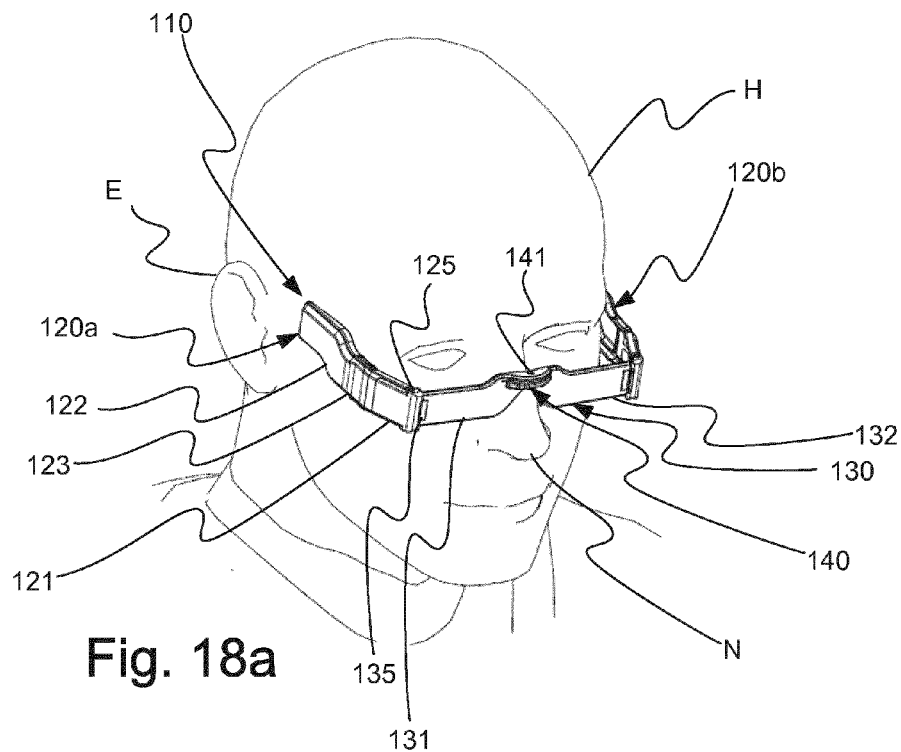
FIGS. 18a-b show a pair of spectacles according to an alternative embodiment of the present invention placed on a user.
Figure 18B:
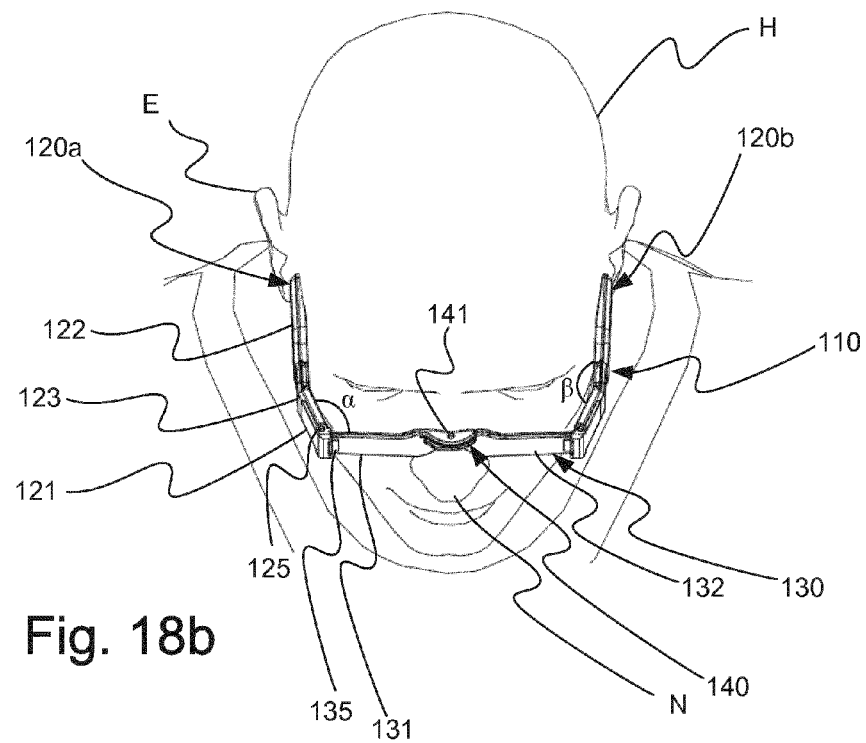

With reference to FIGS. 18a and 18b a pair of spectacles 110 according to a second embodiment is shown. The spectacles 110 include two side pieces 120a, 120b, a front lens piece 130 and a central hinge assembly 140 similar to the first embodiment described above. In this embodiment the side pieces 120a, 120b are provided with a different bias both in the resilient member 123 and in the resilient hinge 125 which gives the spectacles 110 a different appearance but the same function as the second portion 122 of the side piece 120a, 120b still presses against the user's head H.

An idle position of the resilient hinge 125 is when an angle α about 90° is formed between the front lens piece 130 and the first portion 121 and an idle position of the resilient member 123 is when an angle β less than 180°, preferably around 160°, is formed between the first and second portion 121, 122.

The spectacles 110 provide an alternative pair of spectacles to a user with e.g. a large head since the distance between the side pieces 120a, 120b, especially between the two corresponding resilient members 123, can be made longer than the same distance in the first embodiment due to the angle α not having to be less than 90°.

Figure 19A:
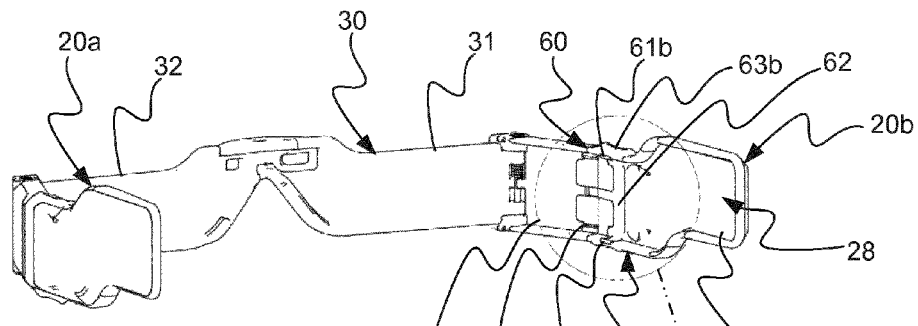
FIGS. 19a-c show a lock hook assembly according to an embodiment.
Figure 19B:
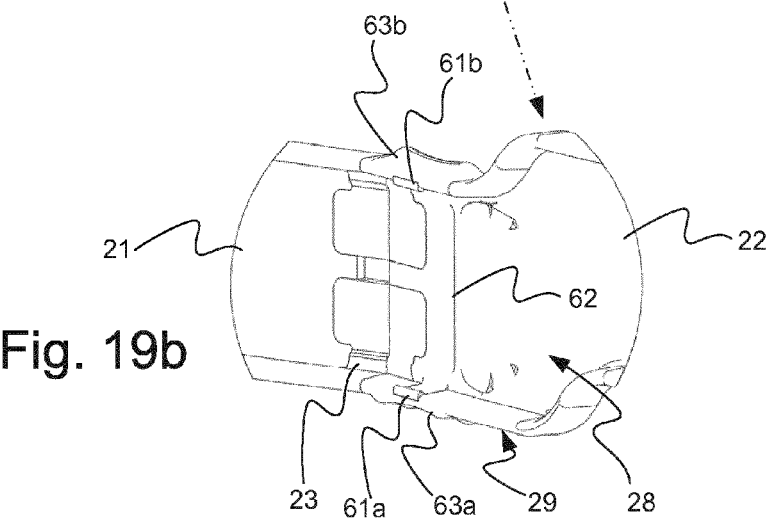
Figure 19C:
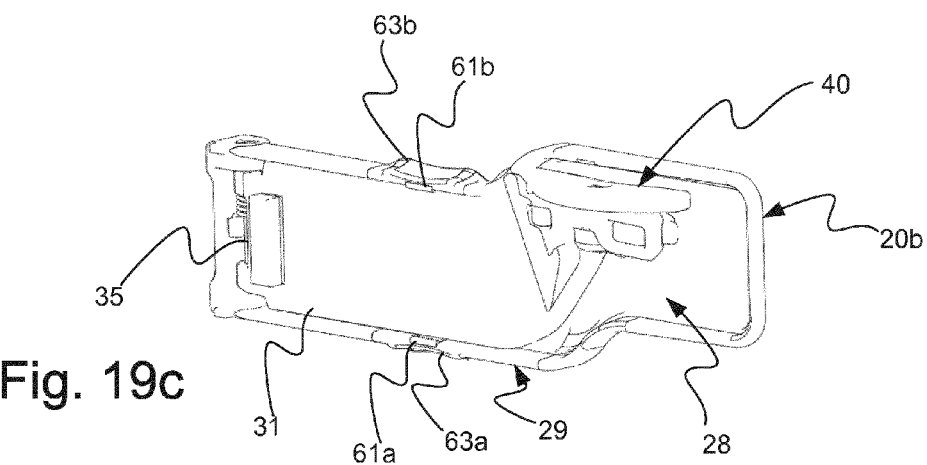

Further, all the embodiments of the present invention may include an optional lock hook assembly 60 which is illustrated in FIGS. 19a-c. The lock hook assembly 60 is preferably arranged on the second portion 22 of the side piece 20a, 20b or close to the resilient member 23. The lock hook assembly 60 comprises two lock hooks 61a, 61b which are connected to each other by means of an elongated intermediate portion 62, wherein the two lock hooks 61a, 61b and the intermediate portion 62 may be manufactured as separate parts or as one piece. The lock hooks 61a, 61b and the intermediate portion 62 are arranged inside the side piece 20a, 20b and extend from the lower part of the rim portion 29, along the center portion 28 and up to the upper part of the rim portion 29. The lock hooks 61a, 62b are configured to grab the lens portion 31, 32, arranged within the space defined by the center portion 28 and the rim portion 29 of the side piece 20a, 20b, in the folded state. The lock hook assembly 60 provides an additional safety feature since the lens portions 31, 32 are kept in place in the folded state, as can be seen in FIG. 19c where one lens portion 31, 32 is folded into the area of the side piece 20a, 20b.

Further, the lock hook assembly 60 comprises two grip portions 63a, 63b located on the upper and lower outer surface of the rim portion 29, preferably in direct contact with the lock hooks 61a, 61b or close to them. The grip portions 63a, 63b are preferably configured to unhook the lock hooks 61a, 61b from the lens portions 31, 32 as the user by means of e.g. his/her forefinger and thumb, gently presses on them.

The parts of the lock hook assembly 60 may be made of a rubber, plastic of metal material and placed anywhere on the side piece 20a, 20b.

Figure 20:
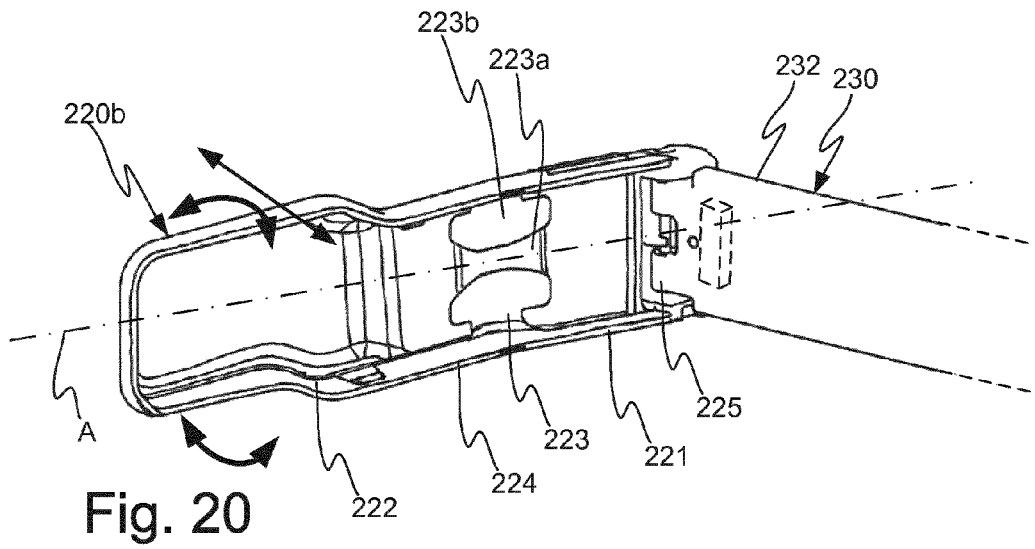
FIG. 20 shows a side piece according to an alternative embodiment.

FIG. 20 illustrates a side piece 220b according to an alternative embodiment. This side piece 220b is similar to the previously described side pieces 20a, 20b, 120a, 120b and it comprises a first portion 221, a second portion 222, a contact member 224, and a resilient hinge 225 which connects the side piece 220b to a front piece 230, the left eye lens portion 232 of which is shown in FIG. 19. The difference lies within the transition portion 223 which in this embodiment comprises a bridge 223a and an associated resilient member 223b. Preferably, the resilient member 223b is made in a flexible material, for instance plastic or rubber, and it is configured to provide the side piece 230b with its spring back effect as described above and with the straight arrow in the figure. The bridge 223a is arranged in the mid section of the transition portion 223, between the first and second portion 221, 222, and it extends along a longitudinal axis A of the side piece 220b. The shape and size of the bridge 223a make it possible to rotate the second portion 222 with respect to the first portion 221, as indicated by the arrows. By this inclining or tilting movement, the side piece 220b may easily adapt to the size and shape of the head of a user. This means that the side piece 220b provides the user with a very comfortable fit when using the spectacles.

Further, the bridge 223a allows the resilient member 223b to be made in a more flexible material which may provide the side piece 220b with an adequate resilience and an efficient spring back effect. The bridge 223b also contributes to a smooth and efficient manufacturing process since it is made in one piece with the first and second portion 221, 222 whereas the bridge 223b holds the two portions 221, 222 together during the process which means that no means for fixing the positions of the different portions 221, 222 are necessary.

Figure 21:
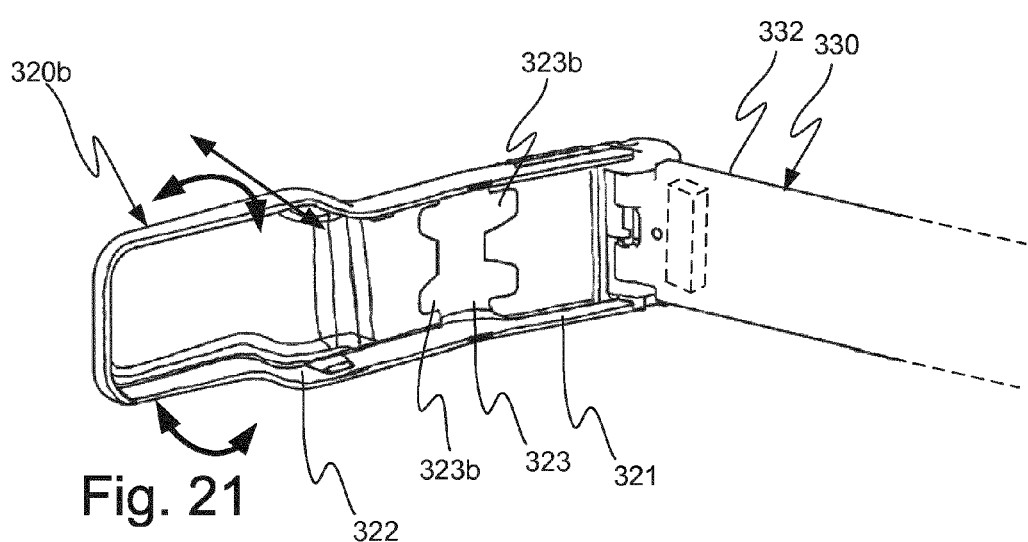
FIG. 21 shows a side piece according to yet another alternative embodiment.

FIG. 21 illustrates yet another side piece 320b with an alternative transition portion 323 where the bridge 223a of the previous embodiment is omitted. The transition portion 323 is instead an I shaped bridge where the two wider portions 323b are configured to increase the adherence between the harder and the softer plastic, i.e. between the first/second portion 321/322 and the transition portion 323. This creates a strong side piece 320a which is wear resistant while still having the favorable spring back effect and rotational movement as previous embodiments.

Figure 22:
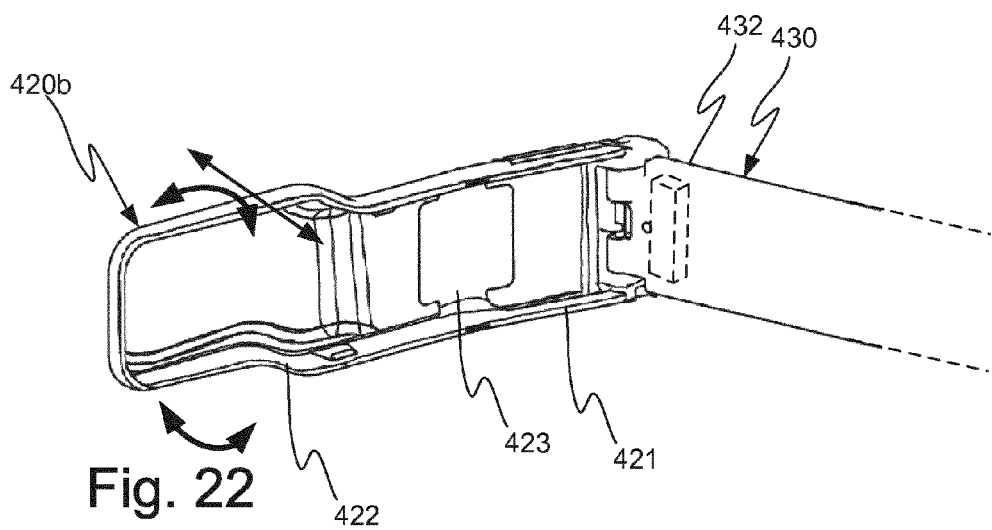
FIG. 22 shows a side piece according to still another alternative embodiment.

FIG. 22 shows still another alternative side piece 420b with yet another transition portion 423, where the transition portion 423 has more of a rectangular shape. The rectangular shape increases further the adherence between the first/second portion 421/422 and the transition portion 423.

It should be mentioned that the inventive concept is by no means limited to the embodiments given as examples above, and modifications are feasible within the inventive idea expressed by the appended claims. For instance, the length and shape of the side pieces and their first and second portions may vary to meet the needs of the user. The same goes for the dimensions of the front lens piece.

The invention claimed is:

1. A side piece for a pair of foldable spectacles, comprising a first portion, a second portion separate from said first portion, and a resilient connecting member pivotally connecting said second portion to said first portion; said first portion being hingedly connected to a front lens piece by a resilient hinge; said resilient connecting member biasing said second portion against a user's head when the spectacles are worn yet allowing said second portion to pivot outwardly relative to said first portion to adapt the position of the second portion to the size of the user's head; said resilient hinge biasing said side piece towards an idle position in which the side piece is folded towards the front lens piece.

2. The side piece according to claim 1, wherein the first and second portions comprise a plastic material.

3. The side piece according to claim 1, wherein the connecting member comprises a resilient hinge member.

4. The side piece according to claim 3, wherein the resilient hinge member comprises a flexible material.

5. The side piece according to claim 1, wherein the second portion is configured to be rotatable with respect to the first portion about a longitudinal axis of the side piece.

6. The side piece according to claim 1, further comprising a contact member which extends at least partly along the periphery of the first and second portions and which is configured to frictionally engage with the user's head.

7. The side piece according to claim 6, wherein the contact member which frictionally engages the user's head comprises a flexible plastic material.

8. The side piece according to claim 1, comprising a center portion and a rim portion, wherein the rim portion protrudes from the center portion and wherein the center portion and the rim portion together define a space for accommodating a lens portion in a folded state of the spectacles.

9. The side piece according to claim 1, wherein said resilient connecting member comprises a bridge between the first and second portions extending along a longitudinal axis; said first and second portions defining an elongate axis, said bridge portion enabling said second portion to rotate about said elongate axis.

10. A side piece for a pair of foldable spectacles, comprising a first portion configured to be hinged to a front lens piece; a second portion configured to press against a user's head; and a resilient transition portion between the first and second portions, wherein the resilient transition portion comprises a bridge between the first and second portions extending along a longitudinal axis; the resilient transition portion being configured to adapt the position of the second portion to the size of the user's head, said first portion further comprising a resilient hinge configured to connect the first portion to the front lens piece, and said resilient hinge being biased towards an idle position, in which the side piece is folded towards the front lens piece.

11. The side piece according to claim 10, wherein the first portion, the bridge and the second portion are made in one piece.

12. A front lens piece for a pair of spectacles, comprising a right eye lens portion and a left eye lens portion, wherein the right eye lens portion and the left eye lens portion are interconnected by a central hinge assembly having a central hinge and a locking device, wherein the locking device comprises a snap locking means for locking the right eye lens portion and the left eye lens portion in different angles to each other.

13. The front lens piece according to claim 12, wherein the locking device may be unlocked by pressing on one side of the front lens piece so that the snap locking means unsnaps.

14. A pair of foldable spectacles, comprising:
two side pieces; wherein each side piece comprises a first portion, a second portion separate from said first portion, and a resilient connecting member pivotally connecting said second portion to said first portion; said first portion being hingedly connected to a front lens piece by a resilient hinge; said resilient connecting member biasing said second portion against a user's head when the spectacles are worn yet allowing said second portion to pivot outwardly relative to said first portion to adapt the position of the second portion to the size of the user's head; said resilient hinge biasing said side piece towards an idle position in which the side piece is folded towards the front lens piece; and
wherein said front lens piece comprises a right eye lens portion and a left eye lens portion, said lens portions being interconnected by a central hinge assembly having a central hinge and a locking device.

15. The pair of foldable spectacles according to claim 14 wherein:
each of said side pieces comprising a center portion and a rim portion; said rim portion protruding from the center portion such that the center portion and the rim portion together define a space sized to accommodate the front lens piece when said spectacles are in a folded state; each of said side pieces further comprising a lock hook arranged within said space; said lock hook being configured to grasp the front lens piece when said spectacles are in said folded state.

16. The pair of foldable spectacles according to claim 14, wherein the right eye lens portion and the left eye lens portion are foldable towards each other, around the central hinge.

17. The pair of foldable spectacles according to claim 14, wherein the locking device is located between the right eye lens portion and the left eye lens portion and configured to interlock the lens portions in an unfolded position.

18. The pair of foldable spectacles according to claim 14, wherein the locking device, when in an unlocked position, allows the two lens portions to be moved to a folded position.

19. The pair of foldable spectacles according to claim 14, further comprising at least two magnets, wherein at least one magnet is located at one end of each lens portion, and wherein the magnets are in contact with each other when the lens portions are in a folded position.

20. The pair of foldable spectacles according to claim 14, wherein each connection between the front lens piece and the two side pieces comprises a resilient corner hinge configured to bias the side pieces toward the user's head.

21. The pair of foldable spectacles according to claim 20, wherein the corner hinges are provided either at the ends of the side pieces connecting to the front lens piece or at each end of the front lens piece connecting to said ends of the side pieces.

22. The pair of foldable spectacles according to claim 14, further comprising a detachable holder which comprises a mounting portion arranged between the side pieces in the folded state, and a projecting ring portion configured to hold a key ring or a strap.

23. The pair of foldable spectacles according to claim 22, wherein the mounting portion of the detachable holder comprises a V shaped part which is configured to be snap locked into position between the two side pieces in the folded position of the spectacles.

24. The pair of foldable spectacles according to claim 22, wherein the mounting portion comprises an opening with a shape that corresponds to the shape of the magnets of the front lens piece and which is arranged between the side pieces so that the magnets are in contact with each other in the folded state.

25. The pair of foldable spectacles according to claim 15 and further including a grip portion located on at least one of an upper and lower outer surface of the rim portion; said grip portion being configured to unhook the lock hook from the lens portion by pressing on said grip portion.

26. The pair of foldable spectacles according to claim 14, said first portion further comprising a resilient hinge configured to connect the first portion to the front lens piece, and said resilient hinge being biased towards an idle position, in which the side piece is folded towards the front lens piece.

27. The pair of foldable spectacles according to claim 14 wherein said resilient connecting member comprises a flexible material which is independent of said first and second portions; said flexible material being secured to said first and second portions along an inner surface of said first and second portions to connect said first and second portions together.

* * * * *